United States Patent
Yamazaki

(10) Patent No.: US 12,411,640 B2
(45) Date of Patent: Sep. 9, 2025

(54) INFORMATION PROCESSING DEVICE, THREE-DIMENSIONAL SHAPING SYSTEM, THREE-DIMENSIONAL SHAPING DEVICE, AND INFORMATION DISPLAY METHOD

(71) Applicant: SEIKO EPSON CORPORATION, Tokyo (JP)

(72) Inventor: Shigeru Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 425 days.

(21) Appl. No.: 17/804,295

(22) Filed: May 26, 2022

(65) Prior Publication Data
US 2022/0382499 A1    Dec. 1, 2022

(30) Foreign Application Priority Data

May 27, 2021 (JP) .................................. 2021-089068

(51) Int. Cl.
*G06F 3/12* (2006.01)
*B29C 64/393* (2017.01)
(Continued)

(52) U.S. Cl.
CPC .......... *G06F 3/1256* (2013.01); *B29C 64/393* (2017.08); *B33Y 10/00* (2014.12);
(Continued)

(58) Field of Classification Search
CPC ... G06F 3/1256; G06F 3/1208; B29C 64/393; B29C 64/106; B29C 64/209;
(Continued)

(56) References Cited

U.S. PATENT DOCUMENTS

2015/0134095 A1*  5/2015  Hemani ................. G06T 19/00
                                                                     700/98
2016/0136883 A1*  5/2016  Schmidt ............... B29C 64/386
                                                                     264/129

(Continued)

FOREIGN PATENT DOCUMENTS

JP    2018-012220    1/2018
JP    2018-047623    3/2018
(Continued)

*Primary Examiner* — Kamini S Shah
*Assistant Examiner* — Mohammed Shafayet
(74) *Attorney, Agent, or Firm* — WORKMAN NYDEGGER

(57) ABSTRACT

An information processing device includes a data processing unit that specifies a void region of a three-dimensional shaped object based on shaping data for shaping the three-dimensional shaped object, the shaping data including path information indicating a movement path of a discharge unit that moves while discharging a shaping material and discharge amount information indicating a discharge amount of the shaping material in the movement path; and a display control unit that display, on a display unit, at least a part of first shape data indicating a shape of the three-dimensional shaped object generated based on the shaping data, in which the display control unit performs, on the display unit, a display that can specify the void region in at least a part of the first shape data.

15 Claims, 27 Drawing Sheets

(51) Int. Cl.
  *B33Y 10/00* (2015.01)
  *B33Y 50/02* (2015.01)
  *G05B 19/4099* (2006.01)

(52) U.S. Cl.
  CPC .......... *B33Y 50/02* (2014.12); *G05B 19/4099* (2013.01); *G06F 3/1208* (2013.01); *G05B 2219/32149* (2013.01); *G05B 2219/35145* (2013.01); *G05B 2219/49007* (2013.01)

(58) Field of Classification Search
  CPC ....... B29C 64/227; B33Y 10/00; B33Y 50/02; G05B 19/4099; G05B 2219/32149; G05B 2219/35145; G05B 2219/49007
  See application file for complete search history.

(56) References Cited

U.S. PATENT DOCUMENTS

| | | | |
|---|---|---|---|
| 2017/0372513 A1* | 12/2017 | Zeng | ........................ G06T 19/00 |
| 2018/0022031 A1 | 1/2018 | Ishii | |
| 2018/0079141 A1 | 3/2018 | Yoshida et al. | |
| 2019/0243589 A1* | 8/2019 | Chen | ...................... B33Y 50/02 |
| 2023/0321915 A1* | 10/2023 | Steinberg | .............. B29C 64/118 |

FOREIGN PATENT DOCUMENTS

| | | |
|---|---|---|
| JP | 2019-025759 | 2/2019 |
| JP | 2019-139730 | 8/2019 |

\* cited by examiner

FIG. 19
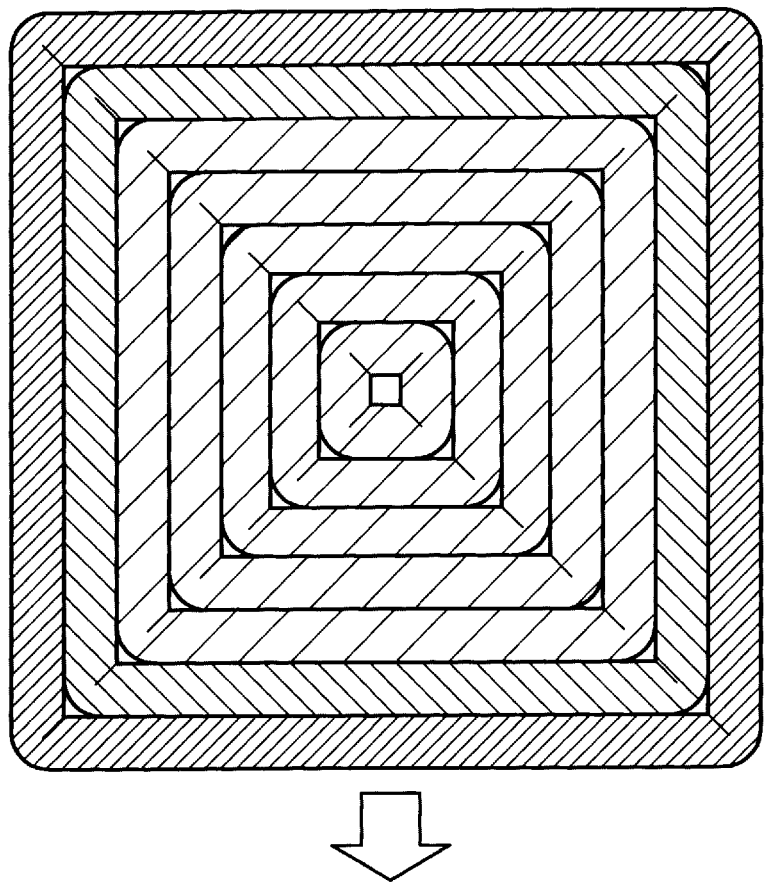
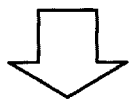
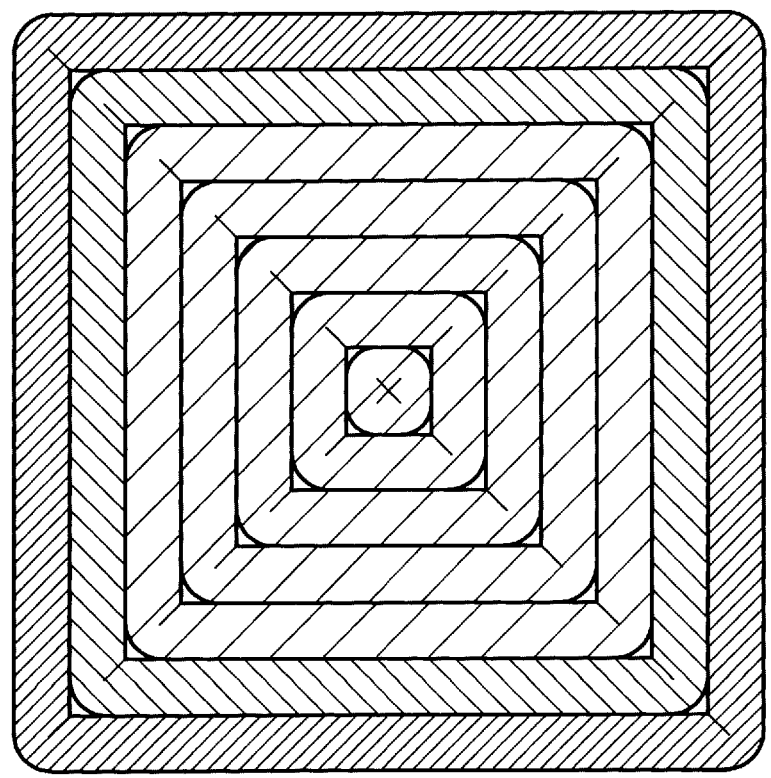

INFORMATION PROCESSING DEVICE, THREE-DIMENSIONAL SHAPING SYSTEM, THREE-DIMENSIONAL SHAPING DEVICE, AND INFORMATION DISPLAY METHOD

The present application is based on, and claims priority from JP Application Serial Number 2021-089068, filed May 27, 2021, the disclosure of which is hereby incorporated by reference herein in its entirety.

BACKGROUND

1. Technical Field

The present disclosure relates to an information processing device, an information display method, a three-dimensional shaping system, and a three-dimensional shaping device.

2. Related Art

Regarding a three-dimensional shaping system, JP-A-2018-47623 describes a technique of generating shaped object data representing a shaped object to be shaped by a 3D printer, and displaying a preview image for an operator to check a shape or the like of the shaped object in advance based on the shaped object data.

By displaying the preview image as described in JP-A-2018-47623, a shaped object that is not intended by a user can be prevented from being shaped. However, with the preview image in the related art, the user can only confirm the shape in advance, and it is difficult to confirm information related to shaping quality in advance.

SUMMARY

A first aspect of the present disclosure provides an information processing device. The information processing device includes a data processing unit that specifies a void region of a three-dimensional shaped object based on shaping data for shaping the three-dimensional shaped object, the shaping data including path information indicating a movement path of a discharge unit that moves while discharging a shaping material and discharge amount information indicating a discharge amount of the shaping material in the movement path; and a display control unit that displays, on a display unit, at least a part of first shape data indicating a shape of the three-dimensional shaped object generated based on the shaping data, in which the display control unit performs, on the display unit, a display configured to specify the void region in at least a part of the first shape data.

A second aspect of the present disclosure is directed to a three-dimensional shaping system including the above-described information processing device, and a three-dimensional shaping device that shapes the three-dimensional shaped object according to the shaping data.

A third aspect of the present disclosure is directed to a three-dimensional shaping device configured to be coupled to the above-described information processing device.

A fourth aspect of the present disclosure provides an information display method. The information display method includes a specifying step of specifying a void region of a three-dimensional shaped object based on shaping data for shaping the three-dimensional shaped object, the shaping data including path information indicating a movement path of a discharge unit that moves while discharging a shaping material and discharge amount information indicating a discharge amount of the shaping material in the movement path; and a displaying step of displaying, on a display unit, at least a part of first shape data indicating a shape of the three-dimensional shaped object generated based on the shaping data, in which the displaying step performs, on the display unit, a display configured to specify the void region in at least a part of the first shape data.

BRIEF DESCRIPTION OF THE DRAWINGS

FIG. 19 is a diagram illustrating a first modification example of shaping data.

DESCRIPTION OF EXEMPLARY EMBODIMENTS

A. First Embodiment

Figure 1:
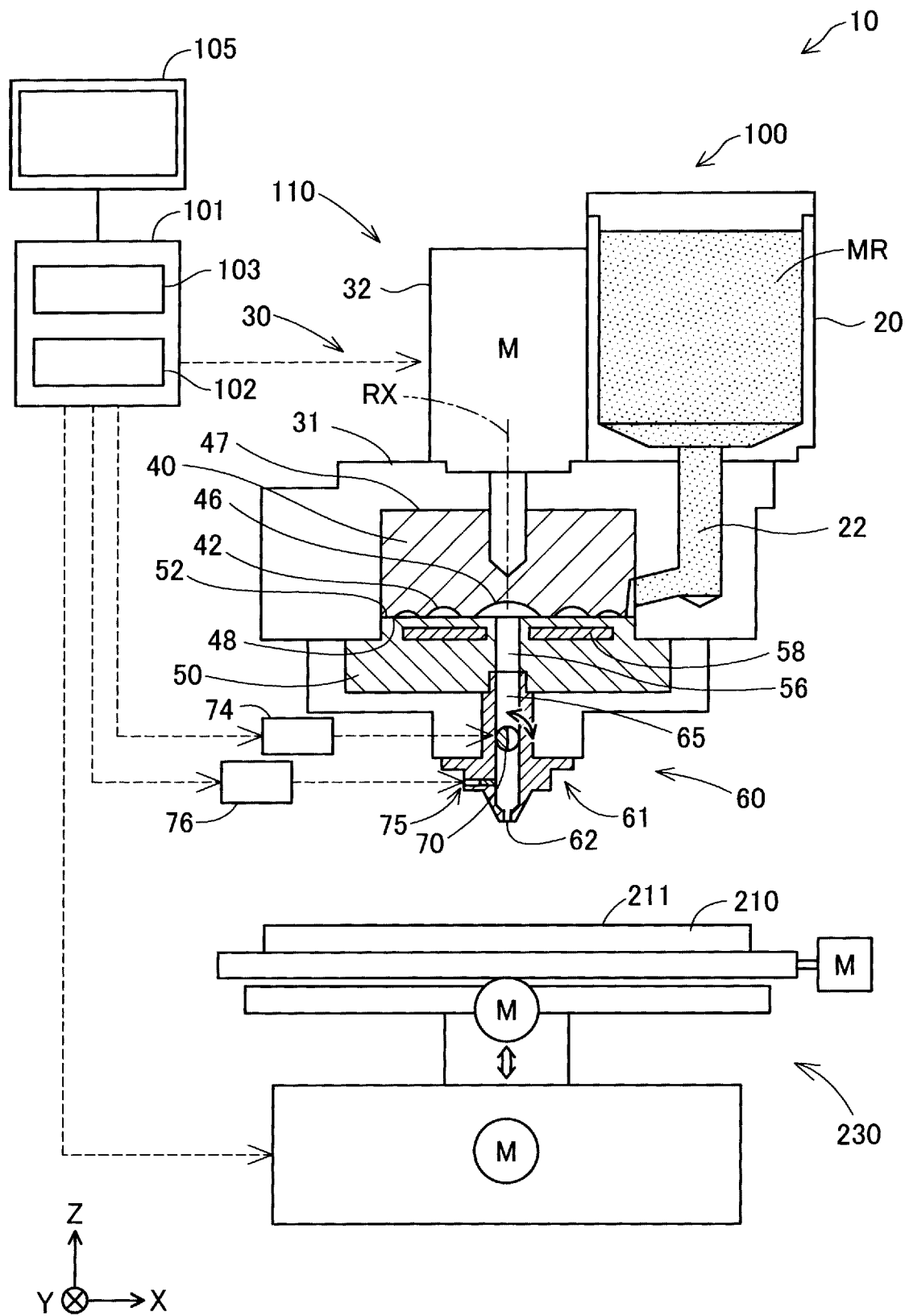
FIG. 1 is a diagram illustrating a schematic configuration of a three-dimensional shaping system.

FIG. 1 is a diagram illustrating a schematic configuration of a three-dimensional shaping system 10 according to a first embodiment. FIG. 1 illustrates arrows indicating X, Y, and Z directions orthogonal to each other. The X direction and the Y direction are directions parallel to a horizontal plane, and the Z direction is a direction along a vertically upward direction. The arrows indicating the X, Y, and Z directions are appropriately illustrated in other drawings such that illustrated directions correspond to those in FIG. 1. In the following description, when a direction is specified, a direction indicated by an arrow in each drawing is referred to as "+", a direction opposite thereto is referred to as "−", and a positive or negative sign is used in combination with a direction notation. Hereinafter, a +Z direction is also referred to as "upper", and a −Z direction is also referred to as "lower".

The three-dimensional shaping system 10 includes a control unit 101 and a three-dimensional shaping device 100 configured to be coupled to the control unit 101. The three-dimensional shaping device 100 includes a shaping unit 110 that generates and discharges a shaping material, a shaping stage 210 as a base of a three-dimensional shaped object, and a moving mechanism 230 that controls a discharge position of the shaping material. The three-dimensional shaping device 100 may be accommodated in a chamber (not shown).

Under control of the control unit 101, the shaping unit 110 melts a material in a solid state and discharges the shaping material in a form of a paste onto the stage 210. The shaping unit 110 includes a material supply unit 20 as a supply source of the material before being converted into the shaping material, a shaping material generating unit 30 that converts the material into the shaping material, and a discharge unit 60 that discharges the shaping material.

The material supply unit 20 supplies a raw material MR for generating the shaping material to the shaping material generating unit 30. The material supply unit 20 is implemented by, for example, a hopper in which the raw material MR is accommodated. The material supply unit 20 has a discharge port on a lower side. The discharge port is coupled to the shaping material generating unit 30 via a communication path 22. The raw material MR is charged into the material supply unit 20 in a form of pellets, powders, and the like. In the present embodiment, a pellet-shaped ABS resin material is used.

The shaping material generating unit 30 melts the raw material MR supplied from the material supply unit 20 to generate a paste-shaped shaping material exhibiting fluidity, and guides the shaping material to the discharge unit 60. The shaping material generating unit 30 includes a screw case 31, a drive motor 32, a flat screw 40, and a screw facing portion 50. The flat screw 40 is also referred to as a rotor or a scroll, and the screw facing portion 50 is also referred to as a barrel.

Figure 2:
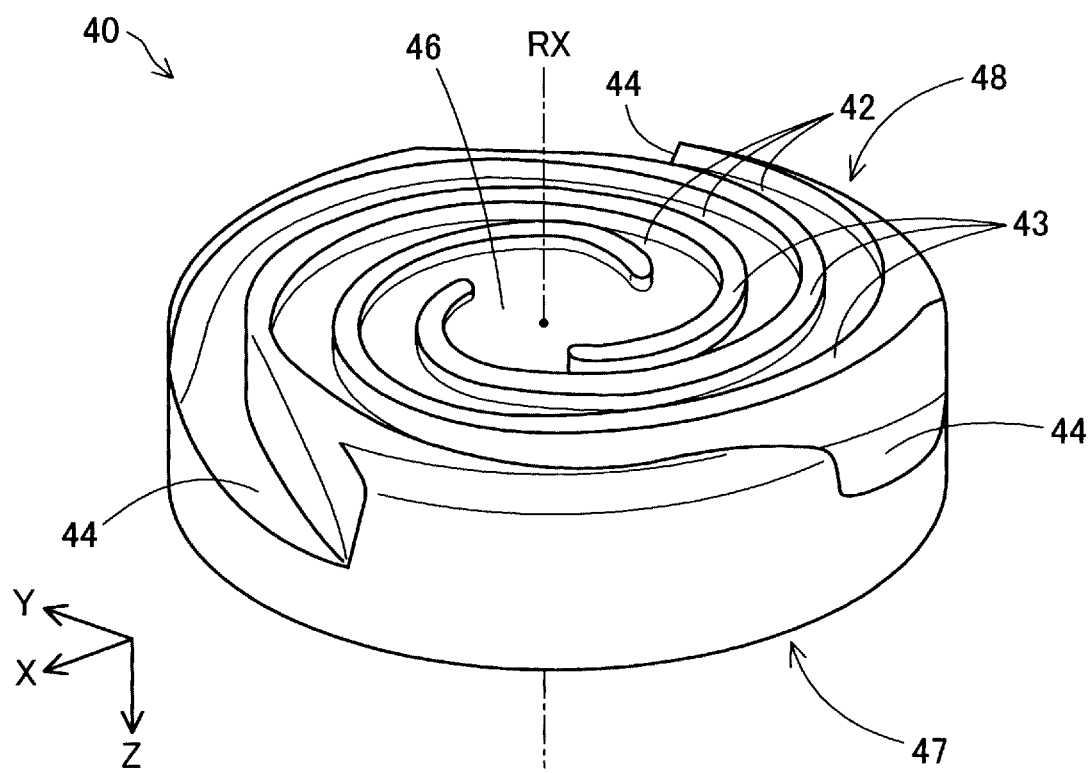
FIG. 2 is a perspective view illustrating a schematic configuration of a flat screw.
Figure 3:
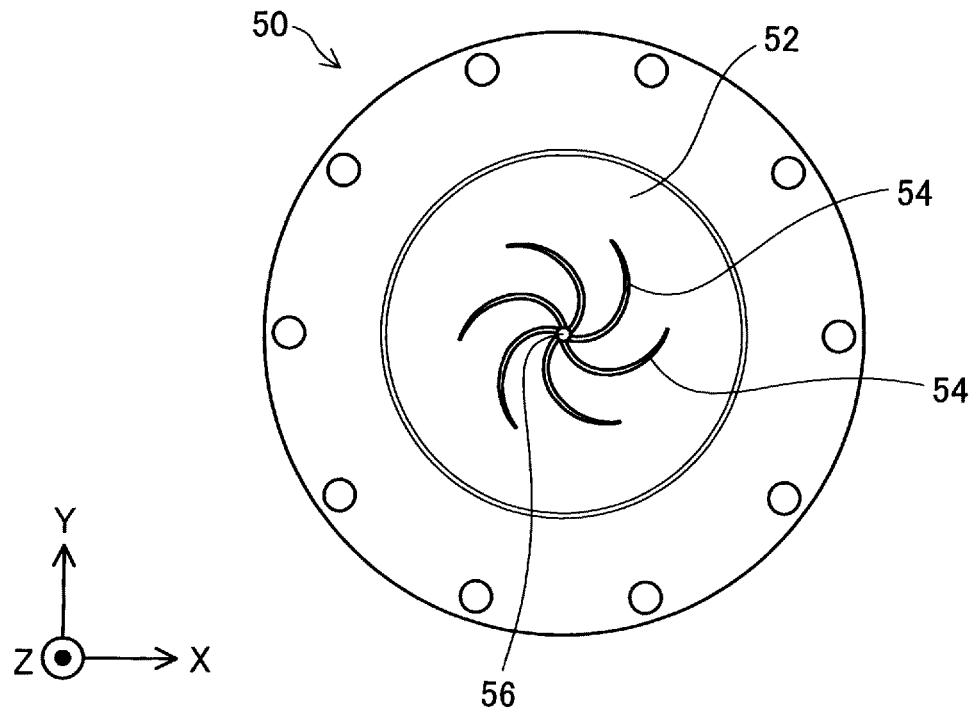
FIG. 3 is a schematic plan view of a screw facing portion.

FIG. 2 is a perspective view illustrating a schematic configuration of a lower surface 48 side of the flat screw 40. In order to facilitate understanding of the technique, the flat screw 40 illustrated in FIG. 2 is illustrated in a state where a positional relation between an upper surface 47 and the lower surface 48 illustrated in FIG. 1 is reversed in a vertical direction. FIG. 3 is a schematic plan view illustrating an upper surface 52 side of the screw facing portion 50. The flat screw 40 has a substantially cylindrical shape whose height in an axial direction, which is a direction along a central axis of the flat screw 40, is smaller than a diameter of the flat screw 40. The flat screw 40 is disposed such that a rotation axis RX serving as a rotation center of the flat screw 40 is parallel to the Z direction.

The flat screw 40 is accommodated in the screw case 31. An upper surface 47 side of the flat screw 40 is coupled to the drive motor 32, and the flat screw 40 is rotated in the screw case 31 by a rotational drive force generated by the drive motor 32. The drive motor 32 is driven under the control of the control unit 101. The flat screw 40 may be driven by the drive motor 32 via a speed reducer.

Spiral groove portions 42 are formed on the lower surface 48, which is a surface intersecting the rotation axis RX, of the flat screw 40. The communication path 22 of the material supply unit 20 described above communicates with the groove portions 42 from a side surface of the flat screw 40. As illustrated in FIG. 2, in the present embodiment, three groove portions 42 are formed so as to be separated from each other by ridge portions 43. The number of the groove portions 42 is not limited to three, and may be one or two or more. A shape of the groove portions 42 is not limited to a spiral shape, and may be a helical shape or an involute curve shape, or may be a shape extending so as to draw an arc from a central portion toward an outer periphery.

The lower surface 48 of the flat screw 40 faces the upper surface 52 of the screw facing portion 50, and a space is formed between the groove portions 42 of the lower surface 48 of the flat screw 40 and the upper surface 52 of the screw facing portion 50. In the shaping unit 110, the raw material MR is supplied from the material supply unit 20 to material inlets 44 illustrated in FIG. 2 in the space between the flat screw 40 and the screw facing portion 50.

A heater 58 for heating the raw material MR supplied into the groove portions 42 of the rotating flat screw 40 is embedded in the screw facing portion 50. A plurality of guide grooves 54 coupled to a communication hole 56 and extending in a spiral shape from the communication hole 56 toward the outer periphery are formed in the screw facing portion 50. One end of the guide groove 54 may not be coupled to the communication hole 56. The guide grooves 54 may be omitted.

The raw material MR supplied into the groove portions 42 of the flat screw 40 flows along the groove portions 42 by the rotation of the flat screw 40 while being melted in the groove portions 42, and is guided as the shaping material to a central portion 46 of the flat screw 40. The paste-shaped shaping material that flows into the central portion 46 and exhibits fluidity is supplied to the discharge unit 60 via the communication hole 56 provided at a center of the screw facing portion 50 illustrated in FIG. 3. In the shaping material, not all types of substances constituting the shaping material may be melted. The shaping material may be converted into a state having fluidity as a whole by melting at least a part of types of the substances constituting the shaping material.

The discharge unit 60 includes a nozzle 61 that discharges the shaping material, a shaping material flow path 65 provided between the flat screw 40 and the nozzle 61, a flow rate adjusting unit 70 that opens and closes the flow path 65, and an aspiration unit 75 that aspirates and temporarily stores the shaping material. The nozzle 61 is coupled to the communication hole 56 of the screw facing portion 50 through the flow path 65. The nozzle 61 discharges the shaping material generated by the shaping material generating unit 30 from a discharge port 62 at a tip toward the stage 210. A heater that prevents a decrease in temperature of the shaping material discharged onto the stage 210 may be disposed around the nozzle 61.

The flow rate adjusting unit 70 changes an opening degree of the flow path 65 by rotating in the flow path 65. In the present embodiment, the flow rate adjusting unit 70 is implemented by a butterfly valve. The flow rate adjusting unit 70 is driven by a first driving unit 74 under the control of the control unit 101. The first driving unit 74 is implemented by, for example, a stepping motor. The control unit 101 can adjust a flow rate of the shaping material flowing from the shaping material generating unit 30 to the nozzle 61, that is, a flow rate of the shaping material discharged from the nozzle 61, by controlling a rotation angle of the butterfly valve by using the first driving unit 74. The flow rate adjusting unit adjusts the flow rate of the shaping material and controls ON or OFF of an outflow of the shaping material.

The aspiration unit 75 is coupled between the flow rate adjusting unit 70 and the discharge port 62 in the flow path 65. The aspiration unit 75 temporarily aspirates the shaping material in the flow path 65 when the discharge of the shaping material from the nozzle 61 is stopped, thereby preventing an elongating phenomenon in which the shaping material drips like pulling a thread from the discharge port 62. In the present embodiment, the aspiration unit 75 is implemented by a plunger. The aspiration unit 75 is driven by a second driving unit 76 under the control of the control unit 101. The second driving unit 76 is implemented by, for example, a stepping motor, or a rack-and-pinion mechanism that converts a rotational force of a stepping motor into a translational motion of a plunger.

For example, when stopping the discharge of the shaping material from the nozzle 61, the control unit 101 first controls the flow rate adjusting unit 70 to turn off the outflow of the shaping material, and then controls the aspiration unit 75 to aspirate the shaping material. When restarting the discharge of the shaping material from the nozzle 61, the material aspirated by the aspiration unit 75 is sent out by controlling the aspiration unit 75, and then the flow rate adjusting unit 70 is controlled to turn on the outflow of the shaping material. The control unit 101 controls the flow rate adjusting unit 70 and the aspiration unit 75 in this way, so that discharge response of the shaping material can be improved.

The stage 210 is disposed at a position facing the discharge port 62 of the nozzle 61. In the first embodiment, a shaping surface 211 of the stage 210 facing the discharge port 62 of the nozzle 61 is disposed so as to be parallel to the X and Y directions, that is, the horizontal direction. In three-dimensional shaping processing described later, the three-dimensional shaping device 100 shapes a three-dimensional shaped object by discharging the shaping material from the discharge unit toward the shaping surface 211 of the stage 210 and stacking layers. The stage 210 may be provided with a heater for preventing rapid cooling of the shaping material discharged onto the stage 210.

The moving mechanism 230 changes a relative position between the stage 210 and the nozzle 61. In the present embodiment, a position of the nozzle 61 is fixed, and the moving mechanism 230 moves the stage 210. The moving mechanism 230 is implemented by a three-axis positioner that moves the stage 210 in three-axis directions of the X, Y, and Z directions by drive forces of three motors. The moving mechanism 230 changes a relative positional relation between the nozzle 61 and the stage 210 under the control of the control unit 101. In the present specification, unless otherwise specified, a movement of the nozzle 61 means that the nozzle 61 is moved relative to the stage 210.

In another embodiment, instead of the configuration in which the stage 210 is moved by the moving mechanism 230, a configuration in which the moving mechanism 230 moves the nozzle 61 with respect to the stage 210 in a state where a position of the stage 210 is fixed may be adopted. Further, a configuration in which the stage 210 is moved in the Z direction and the nozzle 61 is moved in the X and Y directions by the moving mechanism 230, or a configuration in which the stage 210 is moved in the X and Y directions and the nozzle 61 is moved in the Z direction by the moving mechanism 230 may be adopted. With these configurations, the relative positional relation between the nozzle 61 and the stage 210 can be changed.

The control unit 101 is a control device that controls an overall operation of the three-dimensional shaping device 100. The control unit 101 is implemented by a computer including one or a plurality of processors, a storage device, and an input and output interface for inputting and outputting signals to and from an outside. A display unit 105 implemented by a liquid crystal display, an organic EL display, or the like is coupled to the control unit 101. The control unit 101 exhibits a function as a data processing unit 102 and a display control unit 103 by the processor executing a program or instruction read on the storage device. The data processing unit 102 generates shaping data and specifies a void region of the three-dimensional shaped object. The display control unit 103 displays, on the display unit 105, at least a part of first shape data indicating a shape of the three-dimensional shaped object generated based on the shaping data. The control unit 101 controls the shaping unit 110 including the flow rate adjusting unit 70 and the discharge unit 60 and the moving mechanism 230 according to the shaping data generated by the data processing unit 102 to shape the three-dimensional shaped object on the stage 210. Instead of being implemented by the computer, the control unit 101 may be implemented by a configuration of combining a plurality of circuits for realizing at least a part of the functions. The control unit 101 is also referred to as an information processing device.

The data processing unit 102 acquires second shape data such as three-dimensional CAD data indicating a shape of the three-dimensional shaped object, and generates, based on the second shape data, layer data obtained by slicing the shape of the three-dimensional shaped object into a plurality of layers according to a slicing direction specified by a user. Shaping data is generated for each of the layers included in the layer data, the shaping data including path information indicating a movement path of the discharge unit 60 and discharge amount information indicating a discharge amount of the shaping material in each of the movement paths. The movement path of the discharge unit 60 refers to a path along which the nozzle 61 moves along the shaping surface 211 of the stage 210 while discharging the shaping material. The data processing unit 102 specifies the void region of the three-dimensional shaped object based on the first shape data and the second shape data. Details of processing executed by the data processing unit 102 will be described later.

The path information includes a plurality of partial paths. Each of the partial paths is a linear path represented by a start point and an end point. The discharge amount information is individually associated with each of the partial paths. In the present embodiment, the discharge amount indicated by the discharge amount information is an amount of the shaping material discharged per unit time in the partial path. In another embodiment, a total amount of the shaping material discharged in the entire partial path may be associated with each of the partial paths as the discharge amount information.

Figure 8:
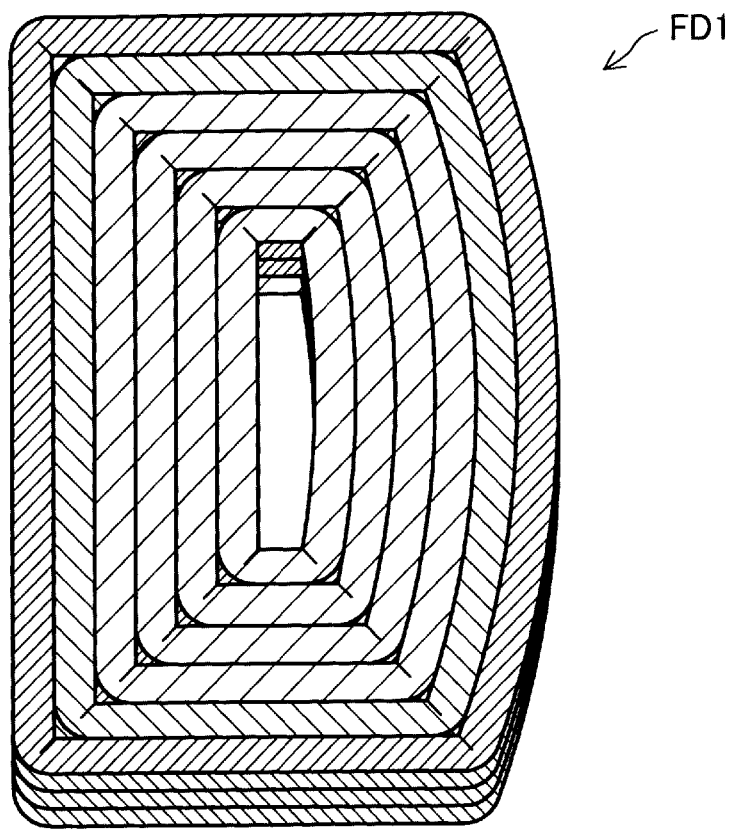
FIG. 8 is a diagram illustrating a display example of first shape data having a void region.

Both the first shape data and the second shape data described above are data indicating the shape of the three-dimensional shaped object, and the second shape data is a source for generating the shaping data, and is, for example, data obtained by modeling a three-dimensional shaped object, which is a shaping target, by using three-dimensional CAD software or three-dimensional CG software. The first shape data is image data for converting the second shape data into the shaping data by shaping data generation processing described later and displaying, on the display unit 105, the shape of the three-dimensional shaped object indicated by the shaping data. Therefore, when the second shape data is displayed on the display unit 105, an ideal three-dimensional shaped object to be shaped is displayed on a screen, and when the first shape data is displayed on the display unit 105, for example, as illustrated in FIG. 8, a three-dimensional shaped object indicated by disposing linear shaping materials in layers is displayed on the screen.

Figure 4:
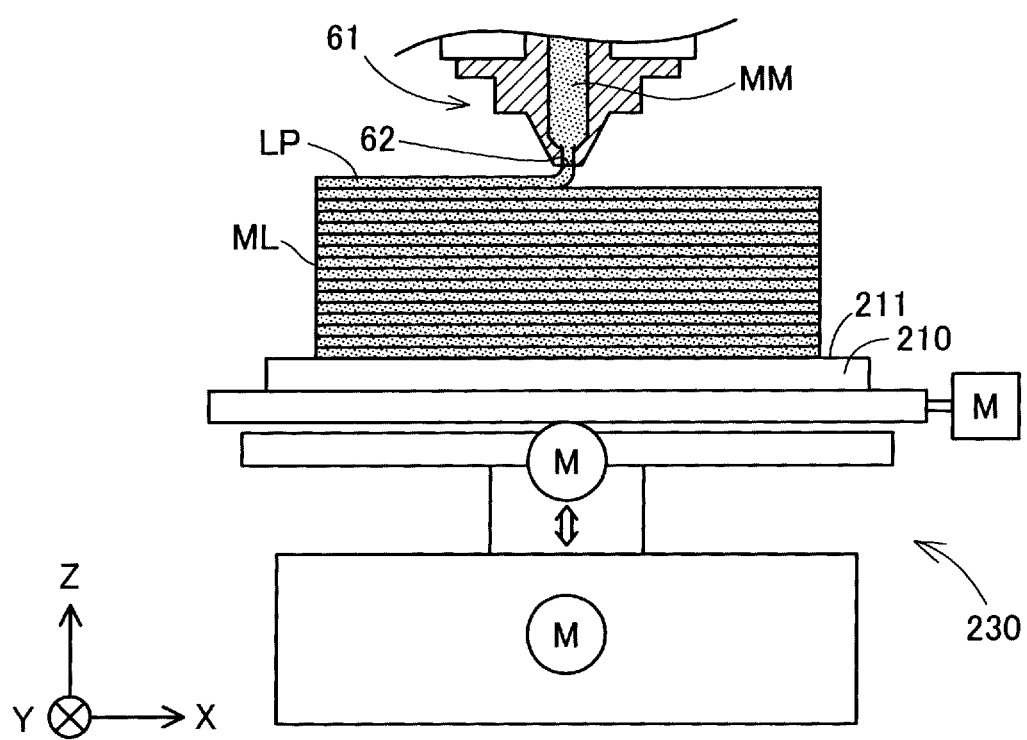
FIG. 4 is a diagram schematically illustrating a state where a three-dimensional shaped object is being shaped.

FIG. 4 is a diagram schematically illustrating a state where a three-dimensional shaped object is being shaped in the three-dimensional shaping device 100. In the three-dimensional shaping device 100, as described above, the solid raw material MR supplied to the groove portions 42 of the rotating flat screw 40 is melted to generate a shaping material MM in the shaping material generating unit 30. The control unit 101 causes the nozzle 61 to discharge the shaping material MM while changing the position of the nozzle 61 with respect to the stage 210 in a direction along the shaping surface 211 of the stage 210 with a distance maintained constant between the shaping surface 211 of the stage 210 and the nozzle 61. The shaping material MM discharged from the nozzle 61 is continuously deposited in a moving direction of the nozzle 61. By performing scanning with the nozzle 61, a linear portion LP that is a shaping portion linearly extending along a scanning path of the nozzle 61 is shaped.

The control unit 101 forms a layer ML by repeating the scanning with the nozzle 61. The control unit 101 moves the position of the nozzle 61 with respect to the stage 210 in the Z direction after one layer ML is formed. Then, a layer ML is further deposited on the layers ML formed so far to shape a three-dimensional shaped object.

For example, the control unit 101 may temporarily interrupt the discharge of the shaping material from the nozzle 61 when the nozzle 61 moves in the Z direction after one layer ML is completed or when there are a plurality of independent shaping regions in each of the layers. In this case, the flow path 65 is closed by the flow rate adjusting unit 70, and the discharge of the shaping material MM from the discharge port 62 is stopped. After changing the position of the nozzle 61, the control unit 101 opens the flow path 65 by the flow rate adjusting unit 70 to restart the deposition of the shaping material MM from the changed position of the nozzle 61.

Figure 5:
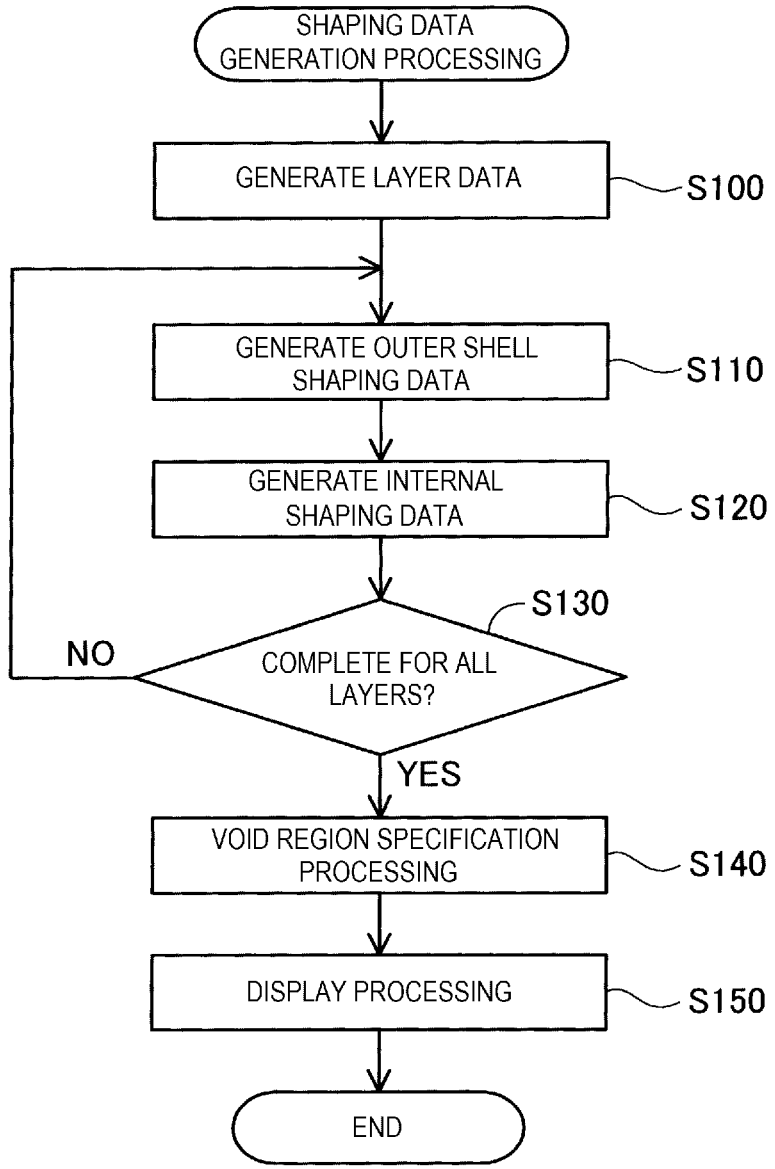
FIG. 5 is a flowchart of shaping data generation processing.

FIG. 5 is a flowchart of shaping data generation processing executed by the control unit 101. The shaping data generation processing is processing for generating the shaping data to be used for shaping the three-dimensional shaped object prior to the shaping of the three-dimensional shaped object, and implementing an information display method for visually displaying, on the display unit 105, the shape of the three-dimensional shaped object indicated by the shaping data.

Figure 6:
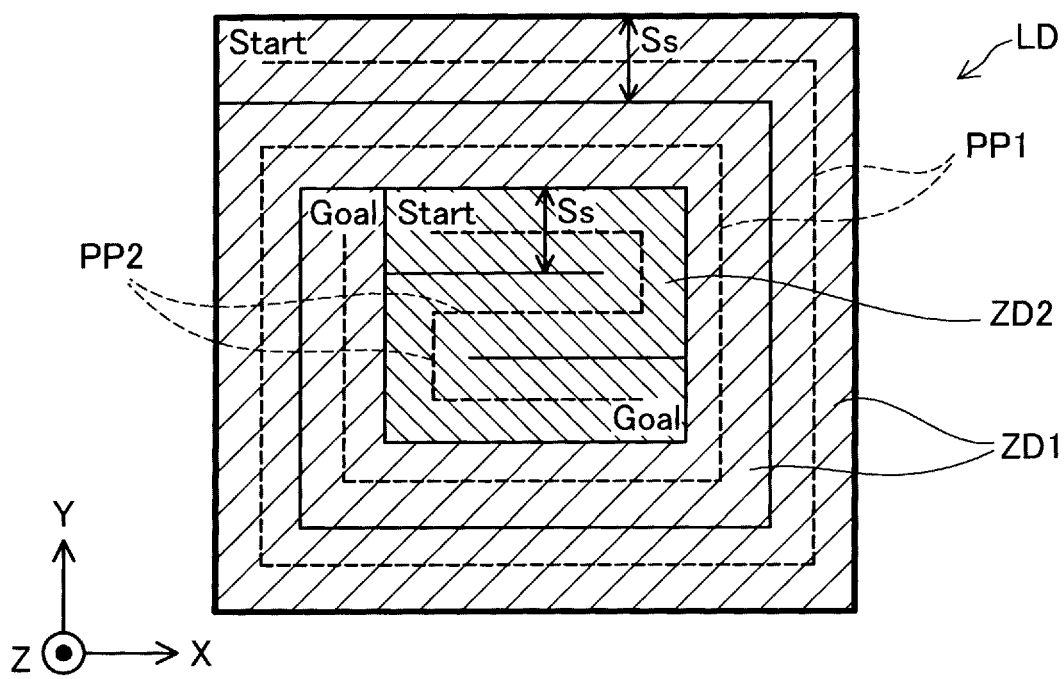
FIG. 6 is a diagram illustrating an example of layer data.

As illustrated in FIG. 5, in step S100, the data processing unit 102 slices the second shape data such as the three-dimensional CAD data indicating the shape of the three-dimensional shaped object input from the outside into a plurality of layers along the slicing direction specified by the user, and generates layer data. The layer data is data indicating an outline of the three-dimensional shaped object in a cross section along the slicing direction. In FIG. 6, a portion corresponding to the outline indicated by layer data LD is illustrated by a thick line. FIG. 6 is a diagram illustrating an example of the layer data LD.

In step S110, the data processing unit 102 generates outer shell shaping data. The outer shell shaping data is data for forming an outer shell region in contact with an inner side of the outline indicated by the layer data LD. The outer shell region is a region influencing an appearance of the three-dimensional shaped object. The outer shell shaping data includes a path for shaping an outermost periphery along the outline of the three-dimensional shaped object. The outer shell shaping data may include not only path information for shaping the outermost periphery of the three-dimensional shaped object but also path information including one inner periphery of the outermost periphery. The number of laps of the path information for forming the outer shell region may be freely set.

FIG. 6 illustrates the example in which outer shell shaping data ZD1 includes outermost path information and the path information for one inner periphery of the outermost periphery. These pieces of path information include a plurality of partial paths PP1 for shaping the outer shell region. As described above, the partial paths PP1 are linear paths. A discharge amount at which the shaping material deposited on the stage 210 has a desired line width Ss is associated with each of the partial paths PP1 as the discharge amount information.

In step S120, the data processing unit 102 generates internal shaping data. The internal shaping data is data for shaping an internal region that is a region inside the outer shell indicated by the layer data LD and is a region other than the outer shell region in the three-dimensional shaped object. The internal region is a region that has a larger influence on intensity of the three-dimensional shaped object than on the appearance of the three-dimensional shaped object.

FIG. 6 illustrates an example in which internal shaping data ZD2 is indicated inside the outer shell shaping data ZD1. In FIG. 6, the path information for filling an internal region indicated by the internal shaping data ZD2 is formed in a manner of meandering by a plurality of partial paths PP2. A pattern of the paths that fill the internal region can be freely selected from various patterns.

As described above, the partial paths PP2 are linear paths. A discharge amount at which the shaping material deposited on the stage 210 has a desired line width Ss is associated with each of the partial paths PP2 as the discharge amount information. In the present embodiment, both a line width of the path formed in the outer shell shaping data ZD1 and a line width of the path formed in the internal shaping data ZD2 have the same width Ss, and they may have different widths.

Hereinafter, the outer shell shaping data generated in step S110 and the internal shaping data generated in step S120 are collectively referred to as "shaping data". The shaping data includes path data indicating, by the plurality of partial paths, a path along which the discharge unit 60 moves while discharging the shaping material, and discharge amount data including discharge amount information indicating the discharge amount of the shaping material in each of the partial paths.

In step S130, the data processing unit 102 determines whether the above processing is completed for all the layer data. When the processing is not completed for all the layer data, the data processing unit 102 repeats the processing of step S110 and step S120 on next layer data.

When the generation of the shaping data for all the layer data is completed, in step S140, the data processing unit 102 specifies the void region of the three-dimensional shaped object based on the generated shaping data. The data processing unit 102 specifies a region of the layer data as a void region, the region excluding a region filled with the shaping data. Then, in step S150, the display control unit 103 executes display processing of displaying, on the display unit 105, at least a part of the first shape data indicating the shape of the three-dimensional shaped object generated based on the shaping data. In the display processing, the display control unit 103 performs, on the display unit 105, a display that can specify the void region in at least a part of the first shape data to be displayed. The display that can specify the void region is also referred to as void information. Specific examples of the void region specification processing and the display processing will be described later. When the display processing is ended, the data processing unit 102 ends the shaping data generation processing. The processing of step S140 is also referred to as a specifying step, and the processing of step S150 is also referred to as a displaying step.

Figure 7:
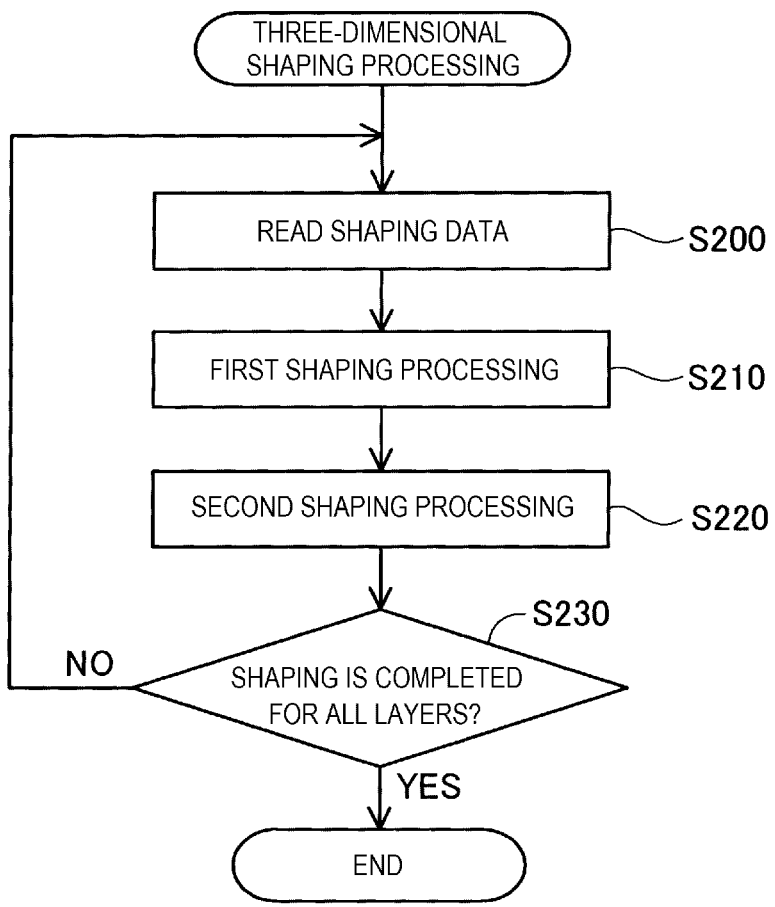
FIG. 7 is a flow chart of three-dimensional shaping processing.

FIG. 7 is a flowchart of the three-dimensional shaping processing executed by the control unit 101. The three-dimensional shaping processing is executed by the control unit 101 by using the shaping data generated in the shaping data generation processing illustrated in FIG. 5. By executing the shaping data generating processing illustrated in FIG. 5 and the three-dimensional shaping processing illustrated in FIG. 7, a method for manufacturing the three-dimensional shaped object by the three-dimensional shaping device 100 is implemented.

In step S200, the control unit 101 acquires the shaping data generated by the shaping data generation processing described above. From the shaping data, the outer shell shaping data and the internal shaping data described above are read for one layer among the plurality of layers constituting the three-dimensional shaped object. In the present embodiment, the control unit 101 first reads shaping data of a lowest layer in the gravity direction among the plurality of layers constituting the three-dimensional shaped object.

In step S210, the control unit 101 executes first shaping processing. In the first shaping processing, the control unit 101 controls the moving mechanism 230 and the discharge unit 60 in accordance with the partial paths included in the outer shell shaping data and the discharge amount information associated with each of the partial paths to form an outer shell region for a current layer.

In step S220, the control unit 101 executes second shaping processing. In the second shaping processing, the control unit 101 controls the moving mechanism 230 and the discharge unit 60 in accordance with the partial paths included in the internal shaping data and the discharge amount information associated with each of the partial paths to form an internal region for the current layer.

In step S230, the control unit 101 determines whether the shaping is completed for all the layers. When the shaping is not completed for all the layers, the processing returns to step S200, and the control unit 101 reads shaping data for a next layer, that is, a layer adjacent to the current layer on an upper side in the gravity direction, and executes processing of step S210 and step S220. In this case, in step S210, prior to the discharge of the shaping material from the discharge unit 60, the control unit 101 controls the moving mechanism 230 to raise the position of the nozzle 61 from the stage 210 by one layer. When the shaping is completed for all the layers, the control unit 101 ends the three-dimensional shaping processing.

Hereinafter, the display processing executed in step S150 of FIG. 5 will be described with reference to FIGS. 8 to 13. The display control unit 103 can cause the display unit 105 to perform various displays described below in the display processing. Each of the displays can be switched by a user performing a predetermined operation on the control unit 101. The display control unit 103 may not be able to perform all the displays described below, and may be able to perform any one or more displays.

FIG. 8 is a diagram illustrating a display example of first shape data FD1 having a void region. The display control unit 103 displays, on the display unit 105, the first shape data FD1 indicating the shape of the three-dimensional shaped object as illustrated in FIG. 8. The first shape data FD1 illustrated in FIG. 8 has a plurality of layers along the slicing direction specified at the time of generating the layer data, and the void region exists in a center of each of the layers. The display control unit 103 can accept a predetermined display operation from the user via an input device such as a mouse or a keyboard, and then display all or part of the first shape data FD1. Therefore, the display control unit 103 can display, on the display unit 105, an optional region, an optional cross section, an optional layer, and an optional partial path of the first shape data FD1.

Figure 9:
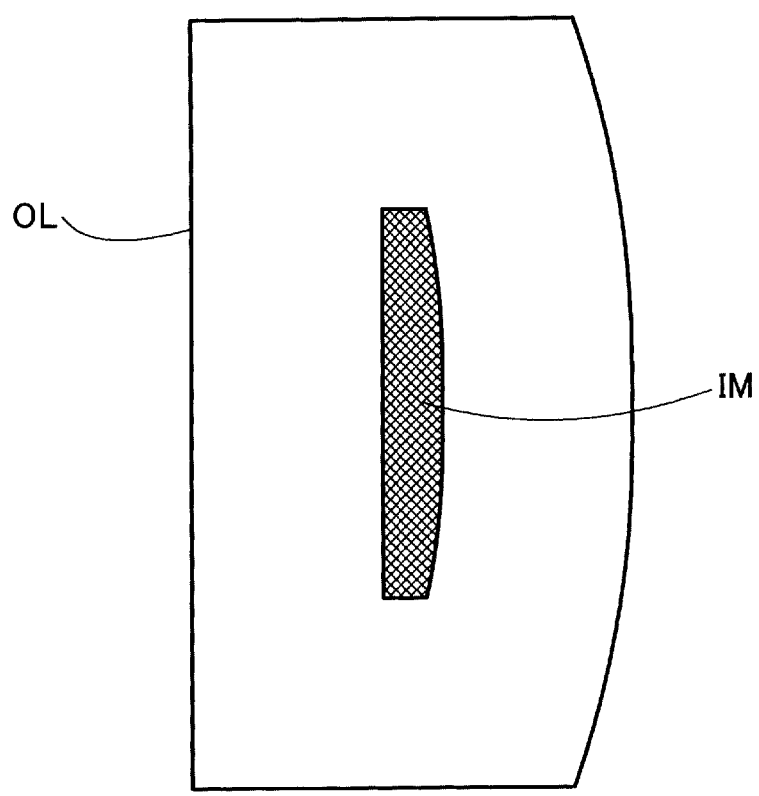
FIG. 9 is a diagram illustrating a first display example of the void region.

FIG. 9 is a diagram illustrating a first display example of the void region. The display control unit 103 can display an outline OL of a layer designated by the user in the first shape data FD1 and display, on the display unit 105, an image IM indicating a range of the void region in the layer.

Figure 10:
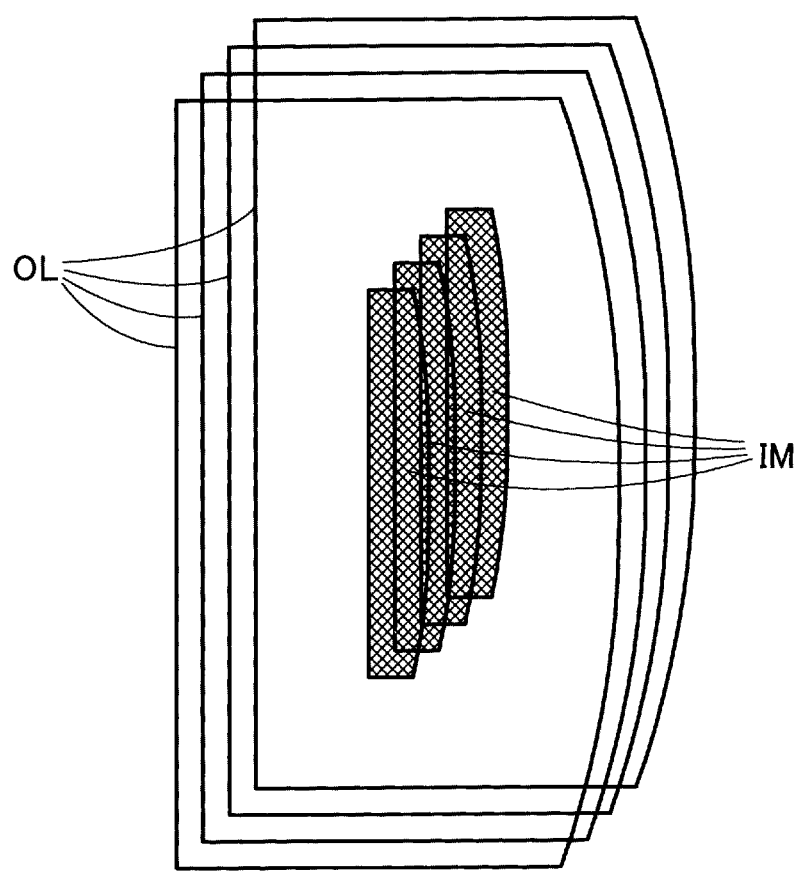
FIG. 10 is a diagram illustrating a second display example of the void region.

FIG. 10 is a diagram illustrating a second display example of the void region. As illustrated in FIG. 10, for the plurality of the layers included in the first shape data FD1, the display control unit 103 can display an outline OL of each of the layers in a wire frame shape, and further causes the display unit 105 to display an image IM indicating a range of a void region of each of the layers. By performing such a display, the user can simultaneously confirm the outlines and the void regions for the plurality of layers.

Figure 11:
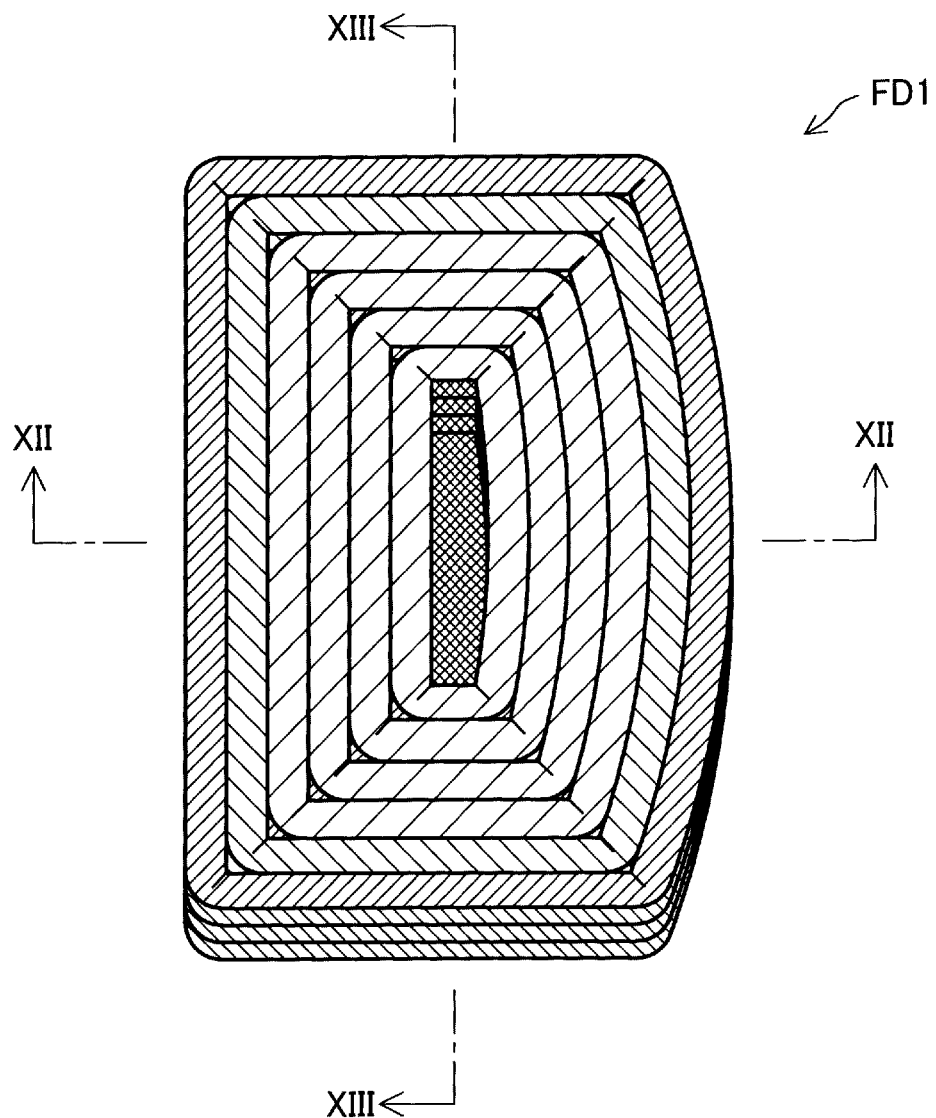
FIG. 11 is a diagram illustrating a third display example of the void region.

FIG. 11 is a diagram illustrating a third display example of the void region. The display control unit 103 can mark and display the void region by coloring the void region on the first shape data FD1 indicating the entire three-dimensional shaped object. By performing such a display, the user can confirm the shape and the range of the void region on the first shape data FD1 displayed three-dimensionally. In FIG. 11, the colored range is shown by cross-hatching.

Figure 12:
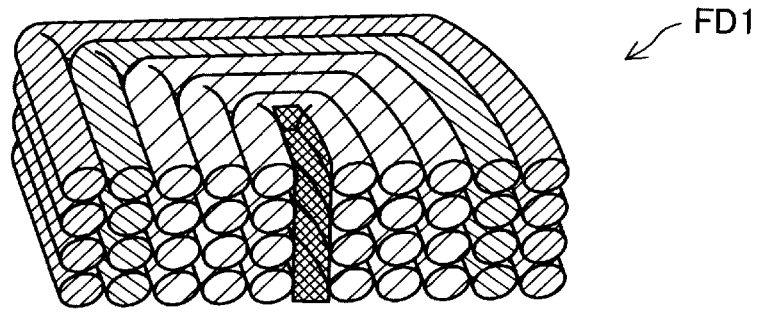
FIG. 12 is a diagram illustrating a horizontal cross section of FIG. 11.
Figure 13:
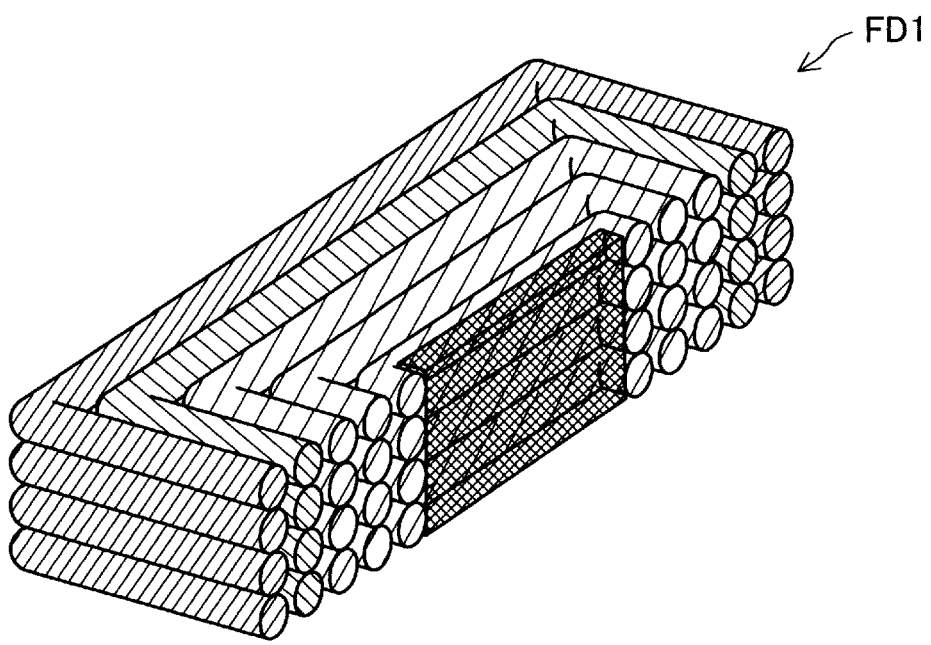
FIG. 13 is a diagram illustrating a vertical cross section of FIG. 11.

FIG. 12 is a diagram illustrating a horizontal cross section of FIG. 11. FIG. 13 is a diagram illustrating a vertical cross section of FIG. 11. The display control unit 103 can accept a predetermined display operation from the user to display an optional cross section, as illustrated in FIG. 12 or 13, of the first shape data FD1 illustrated in FIG. 11. That is, FIGS. 12 and 13 illustrate a part of the first shape data FD1. The display control unit 103 can display the range of the void region by coloring the void region on at least a part of the first shape data FD1 displayed on the display unit 105. By performing such a display, the user can easily confirm the void region inside the first shape data FD1.

According to the first embodiment described above, since the display that can specify the void region in the first shape data FD1 is performed with respect to the display unit 105, the void region of the three-dimensional shaped object, which is related to shaping quality, can be confirmed in advance before shaping. Therefore, unexpected shaping failures can be prevented.

In addition, in the present embodiment, as illustrated in FIG. 9 or 10, an outline OL of the first shape data FD1 indicating the three-dimensional shaped object and the image IM indicating the range of the void region can be displayed on the display unit 105. Therefore, a size of the void region with respect to an outline OL of the three-dimensional shaped object can be easily confirmed.

In the present embodiment, as illustrated in FIGS. 11 to 13, the range of the void region of at least a part of the first shape data FD1 displayed on the display unit 105 can be marked by coloring. Therefore, the position or the range of the void region in the three-dimensional shaped object can be easily confirmed. In the present embodiment, the void region is marked by coloring the void region, and for example, an outer periphery of the void region may be surrounded by a line and marked, or may be marked by displaying an ellipse or a rectangle in a range including the void region. For example, a specific mark such as a circle mark or a star mark may be marked in the void region.

In the present embodiment, the shape of the three-dimensional shaped object can be sliced according to the slicing direction selected by the user to generate the layer data, and the void region in the cross section along the slicing direction can be displayed as the void region according to the slicing direction. Therefore, the position or the range of the void region in an optional cross section perpendicular to the stacking direction of the three-dimensional shaped object can be easily confirmed. By changing the slicing direction in various ways, overlap of the void region and the slicing direction with few voids can be simulated.

B. Second Embodiment

In a second embodiment, the void region is displayed in a mode different from that of the first embodiment. The configuration of the three-dimensional shaping system 10 in the second embodiment is the same as that in the first embodiment.

Figure 14:
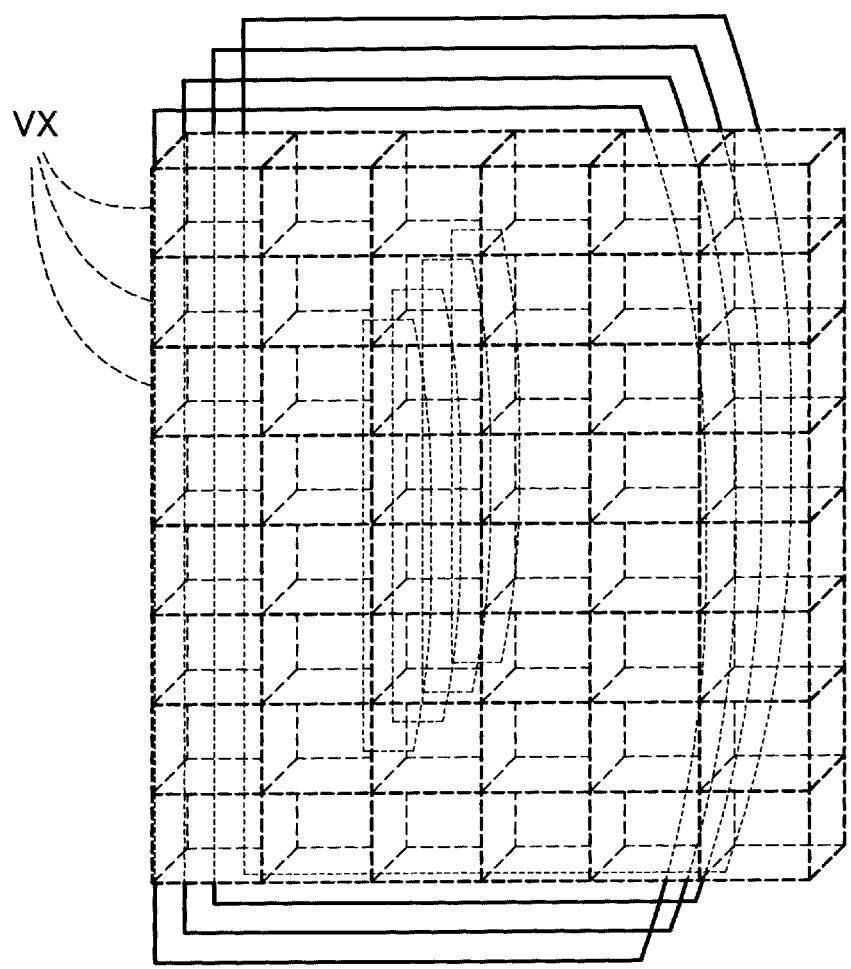
FIG. 14 is a diagram illustrating voxels superimposed on first shaping data.
Figure 15:
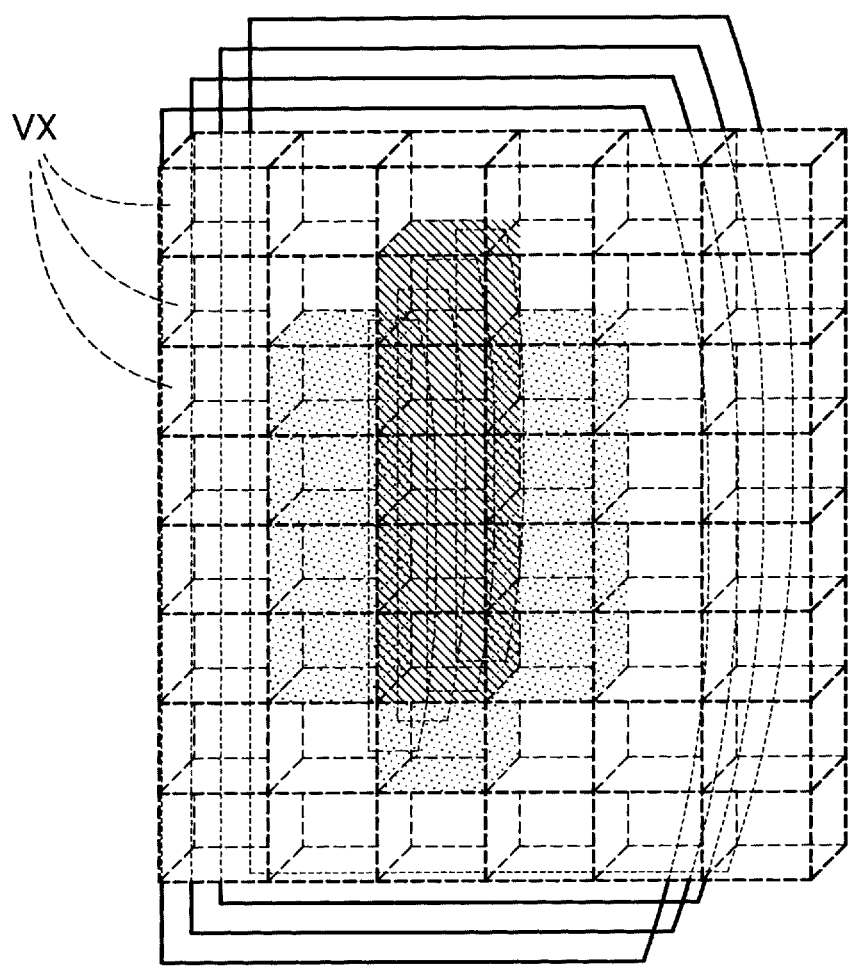
FIG. 15 illustrates a mark displayed in a second embodiment.

FIG. 14 is a diagram illustrating voxels VXs superimposed on first shaping data indicated in a wire frame shape. FIG. 15 illustrates a mark displayed in the second embodiment. In the second embodiment, as illustrated in FIG. 14, the data processing unit 102 divides a region where the three-dimensional shaped object exists into a plurality of voxels VXs in a grid pattern, and calculates a rate of the void region for each voxel VX as a void occupancy rate. The display control unit 103 displays a mark corresponding to the void occupancy rate on the display unit 105 for each voxel VX. The voxel is a unit volume in a three-dimensional space. The void occupancy rate is also referred to as a first rate.

Figure 16:
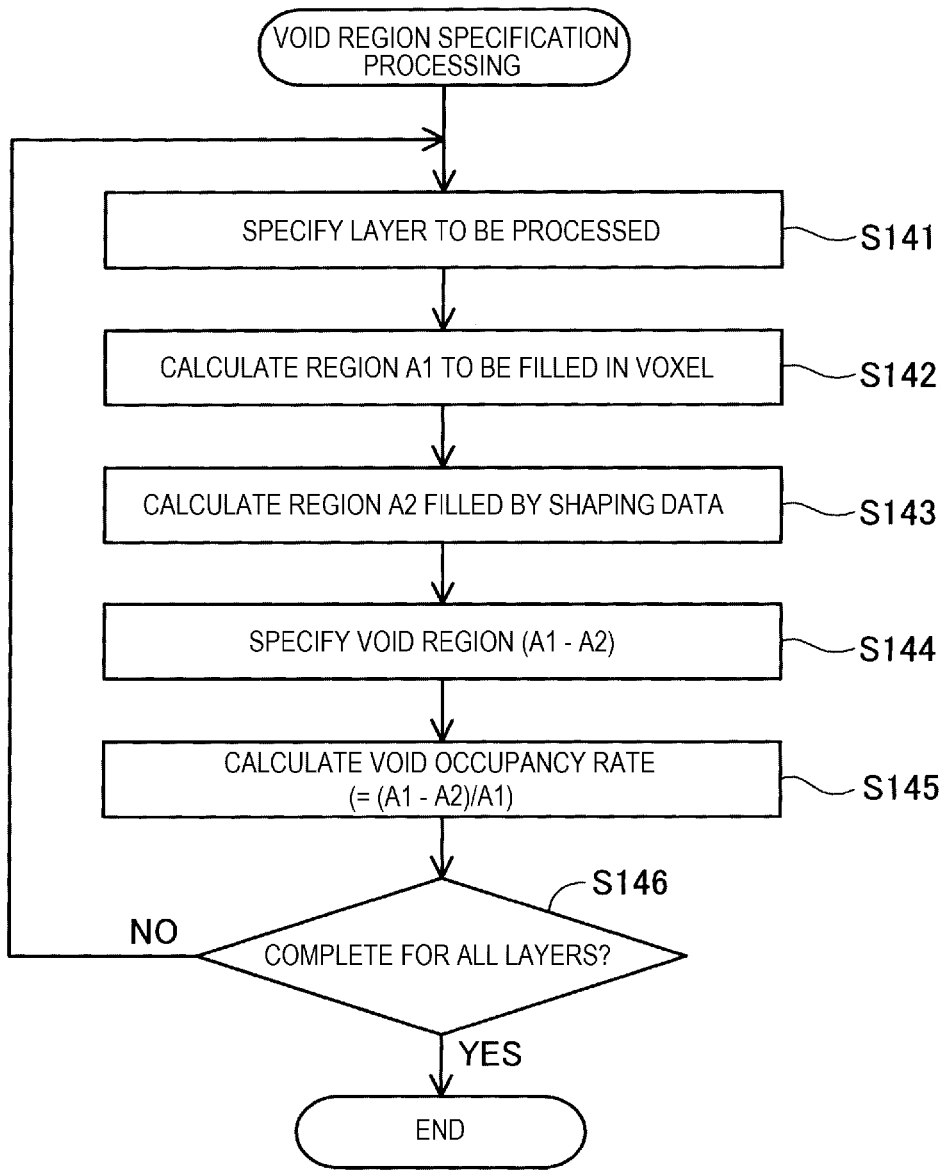
FIG. 16 is a flowchart of void region specification processing.

FIG. 16 is a flowchart of the void region specification processing executed by the data processing unit 102 in the second embodiment. The void region specification processing is processing executed in step S140 illustrated in FIG. 5. In the void region specification processing in the present embodiment, first, the data processing unit 102 specifies the layer to be processed in step S141.

Next, in step S142, the data processing unit 102 calculates a region A1 to be filled in the voxel with the shaping material, for each of the voxels included in the layer to be processed. The region A1 to be filled is a region in the outline indicated by the CAD data, that is, the layer data obtained from the second shape data. For example, in a case of a three-dimensional shaped object having a hole or a cavity inside, such as a donut-shaped three-dimensional shaped object, a region corresponding to the hole or cavity is not included in the region A1 to be filled.

In step S143, the data processing unit 102 calculates, for each of the voxels, a region A2 filled with the shaping data generated in steps S110 and S120 of FIG. 5. Since the region A2 filled with the shaping data is defined by the path included in the shaping data and the discharge amount associated with the path, the region A1 to be filled calculated in step S142 and the region A2 to be filled calculated in step S143 do not always match.

In step S144, the data processing unit 102 specifies a void region for each of the voxels by excluding the region A2 to be filled by the shaping data calculated in step S143 from the region A1 to be filled calculated in step S142.

In step S145, the data processing unit 102 calculates the void occupancy rate for each of the voxels by dividing, by the region A1 to be filled calculated in step S142, the void region specified by step S144, that is, the region excluding the region A2 to be filled from the region A1 to be filled.

In step S146, the data processing unit 102 determines that a series of processing described above is completed for all the layers, and if not completed, the processing returns to step S141 and moves the layer to be processed. When all the layers are completed, the void region specification processing is ended.

When the void region specification processing illustrated in FIG. 16 is ended, the display control unit 103 displays the void occupancy rate for each of the voxels on the display unit 105 in the display processing illustrated in step S150 of FIG. 5. In the present embodiment, as illustrated in FIG. 15, the voxels VXs are superimposed and displayed on the outlines and the void regions of the layers displayed in the wire frame shape, and each of the voxels VXs is marked by coloring according to the void occupancy rate. In FIG. 15 and the followed drawings, the colored voxels are hatched. An example of a correspondence between the void occupancy rate classification and a mark color is shown below.

void occupancy rate 91% to 100%; red
void occupancy rate 71% to 90%; orange
void occupancy rate 51% to 70%; yellow
void occupancy rate 21% to 50%; green
void occupancy rate 1% to 20%; blue
void occupancy rate 0%; no color According to the second embodiment described above, since a mark by coloring is displayed on the display unit 105 according to the void occupancy rate for each of the voxels VXs, the void occupancy rate can be displayed in a heat map. Therefore, the user can visually confirm a density of the voids. In FIG. 15, the voxels VXs are superimposed and displayed on the outline and the void regions of the layers displayed in the wire frame shape, and the voxels VXs may be superimposed and displayed on the three-dimensional first shape data FD1 as illustrated in FIG. 8.

In the present embodiment, since the void region of the three-dimensional shaped object is specified based on the first shape data and the layer data calculated from the second shape data, the void region can be specified more accurately than the void region specified only from the first shape data.

Figure 17:
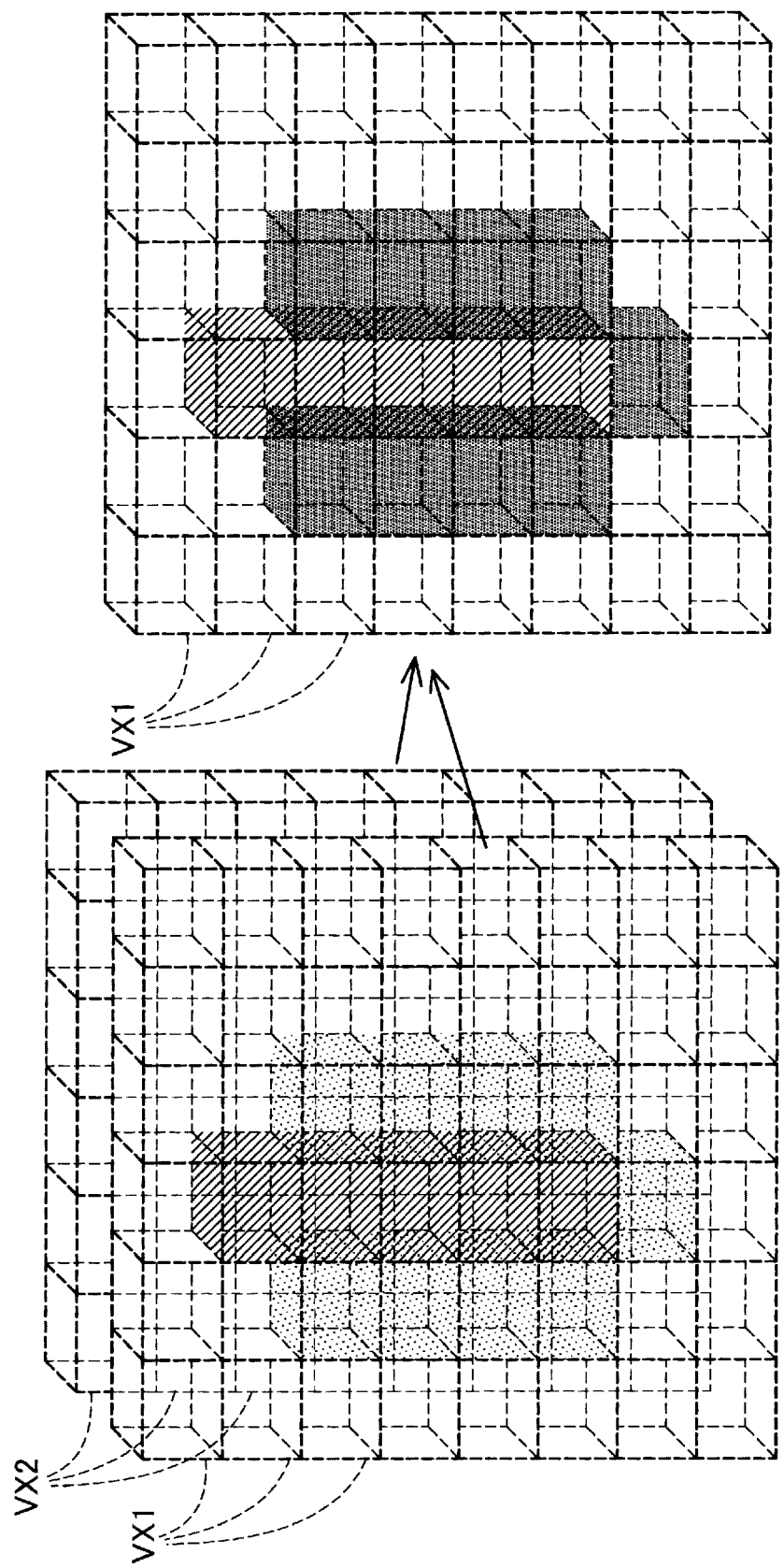
FIG. 17 is a diagram illustrating another display mode of a void occupancy rate.

FIG. 17 is a diagram illustrating another display mode of the void occupancy rate. In the second embodiment described above, when the void region exists at a corresponding position over the plurality of layers, the display control unit 103 may change a mark of a void occupancy rate of voxels VX1 displayed on the display unit 105 according to a void occupancy rate of voxels VX2 in an adjacent layer. Specifically, for example, the data processing unit 102 executes the processing of steps S141 to S145 illustrated in FIG. 16 for two overlapping layers in a predetermined direction. Then, for each of the two layers, the void occupancy rate is calculated for each of the voxels VX1 or the voxels VX2. The void occupancy rate of the voxels VX1 as one display target is referred to as a first rate, and the void occupancy rate of the voxels VX2 as the other display target is referred to as a second rate. Subsequently, the data processing unit 102 changes a color of the voxels VX1 corresponding to the first rate according to the second rate of the voxels VX2 adjacent in the stacking direction. For example, the display control unit 103 increases a level of the color of the voxels VX1 which is the display target, such as from yellow to orange, according to the second rate of the voxels VX2 overlapping the voxels VX1 in the stacking direction. Therefore, the user can visually confirm density of the voids over the plurality of layers. The data processing unit 102 may perform processing for increasing the level of color only when the void occupancy rate of the voxels adjacent in the stacking direction is the same.

Figure 18:
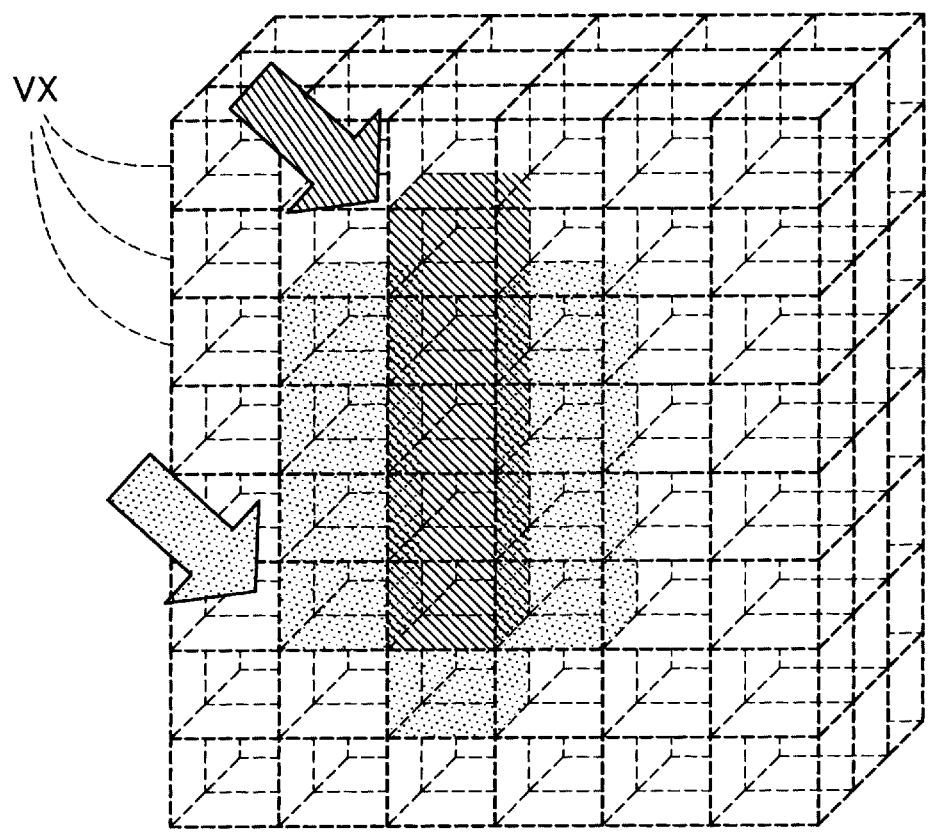
FIG. 18 is a diagram of an alert display.

FIG. 18 is a diagram of an alert display. In the second embodiment, the display control unit 103 may display an alert on the display unit 105 for the voxels whose void occupancy rate is equal to or higher than a predetermined rate. As an aspect of the alert, for example, as illustrated in FIG. 18, the alert may be performed by pointing to the target voxels VXs with arrows. For example, the alert may be given by blinking the target voxels VXs. By displaying the alert, the intensity of the three-dimensional shaped object can be prevented from being unintentionally reduced by the user.

The alert may be made for individual voxels or may be specified to display an alert for a voxel group in a certain range, for example, a voxel group unit of 8 pieces of 2×2×2 or 27 pieces of 3×3×3. For example, for a voxel group in which the total number of red and orange voxels accounts for 80% or more, an alert indicating "warning" may be displayed as an intensity reduction alert. For a voxel group in which the total number of red and orange voxels accounts for 60% to 80%, an alert indicating "attention" may be displayed as an intensity reduction alert. The "warning" and the "attention" can be distinguished by, for example, changing the color of the arrows or blinking cycles.

As described above, when the alert is displayed on the display unit 105, the data processing unit 102 may, in response to an instruction from the user, or automatically, modify the shaping data such that the void region of the voxel whose void occupancy rate is equal to or higher than the predetermined rate is filled with the shaping material.

FIG. 19 is a diagram illustrating a first modification example of the shaping data. In the example illustrated in FIG. 19, the data processing unit 102 fills the void region by modifying the discharge amount information such that a wire diameter of each of the partial paths changes from 0.7 mm to 0.75 mm. By modifying the shaping data such that the void region is filled in this way, the intensity of the three-dimensional shaped object can be increased.

Figure 20:
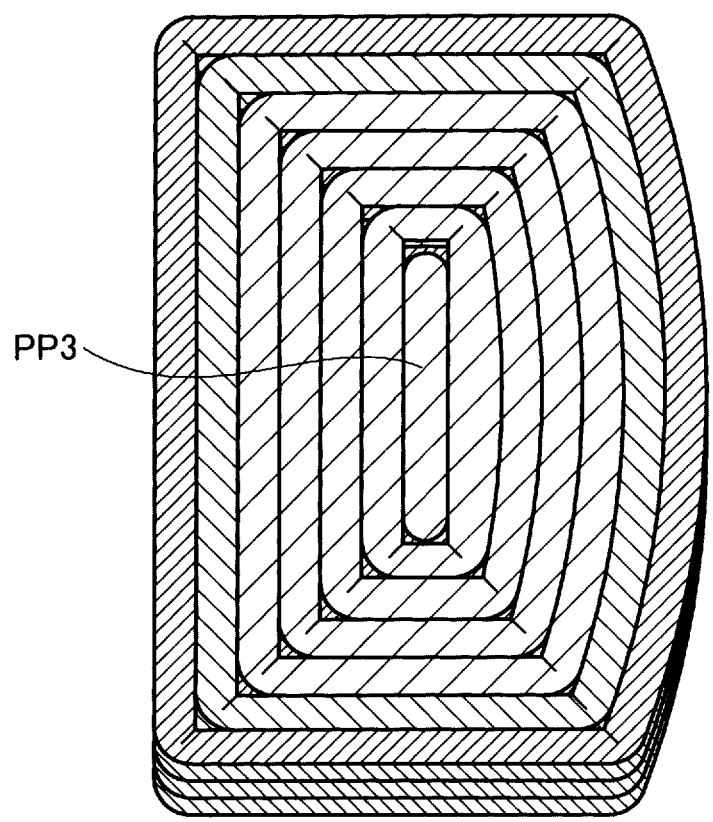
FIG. 20 is a diagram illustrating a second modification example of the shaping data.
Figure 21:
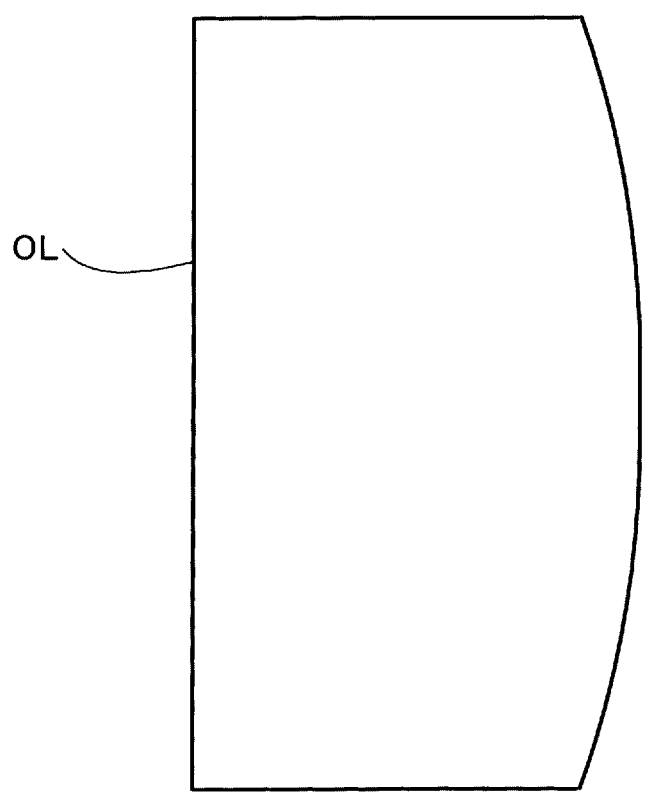
FIG. 21 is a first diagram illustrating a state where a void region disappears.
Figure 22:
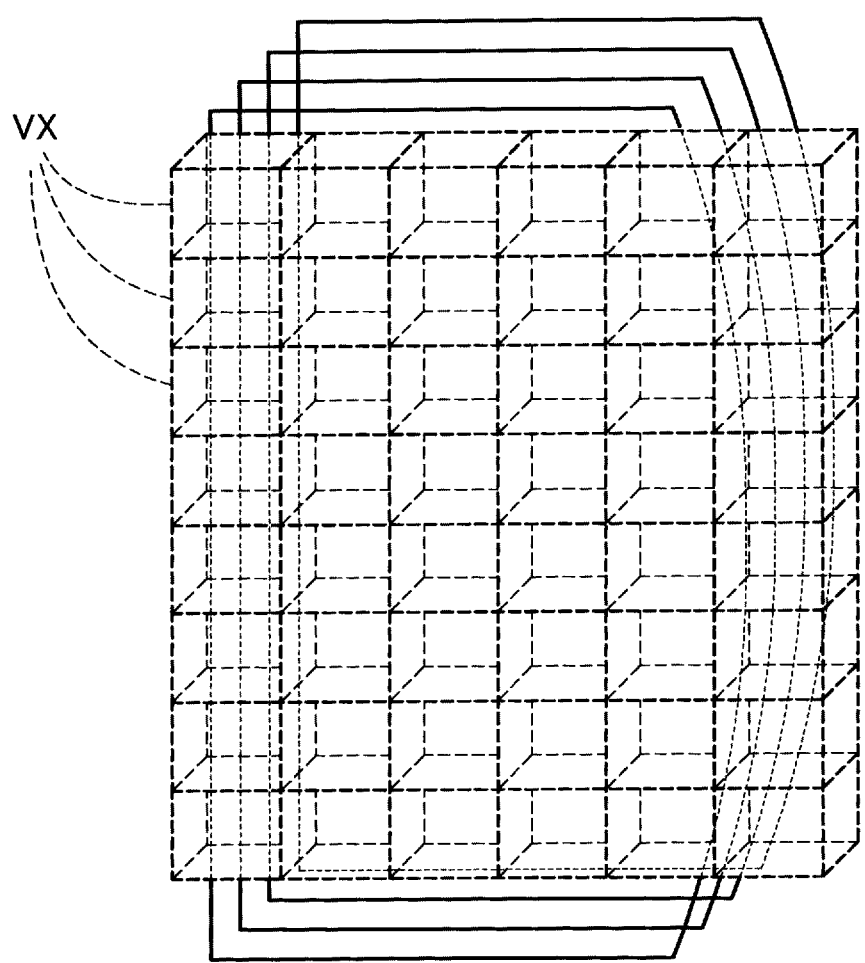
FIG. 22 is a second diagram illustrating a state where the void region disappears.
Figure 23:
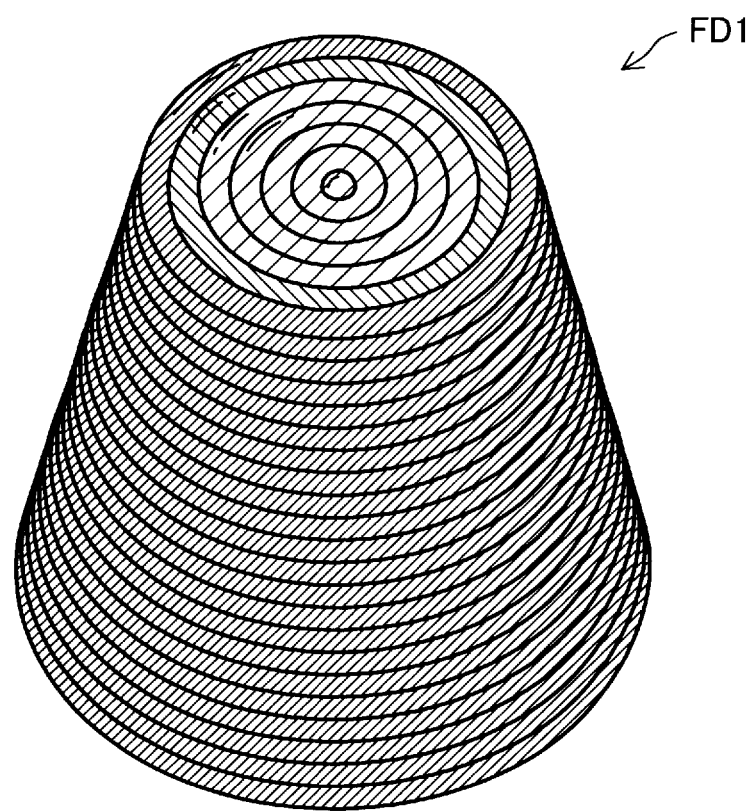
FIG. 23 is a diagram illustrating a display example of truncated cone-shaped first shape data.

FIGS. 20 and 22 are diagrams illustrating a second modification example of the shaping data. In the example illustrated in FIG. 20, the data processing unit 102 modifies the shaping data by adding a partial path PP3 to the void region. In FIG. 20, the independent partial path PP3 is added, but a new partial path may be coupled to the existing paths, or the existing paths may be extended. The data processing unit 102 may adjust a line width of the partial path PP3 to be added according to the width of the void region. When the void region is filled as illustrated in FIG. 20, the void region disappears and only an outline OL of the layer is displayed as illustrated in FIG. 21 when the void region is displayed as illustrated in FIG. 9. As illustrated in FIG. 15, when the void occupancy rate is to be displayed by the voxels, the color of each of the voxels VXs disappears and only grids indicating the voxels VXs become visible as illustrated in FIG. 22.

Figure 24:
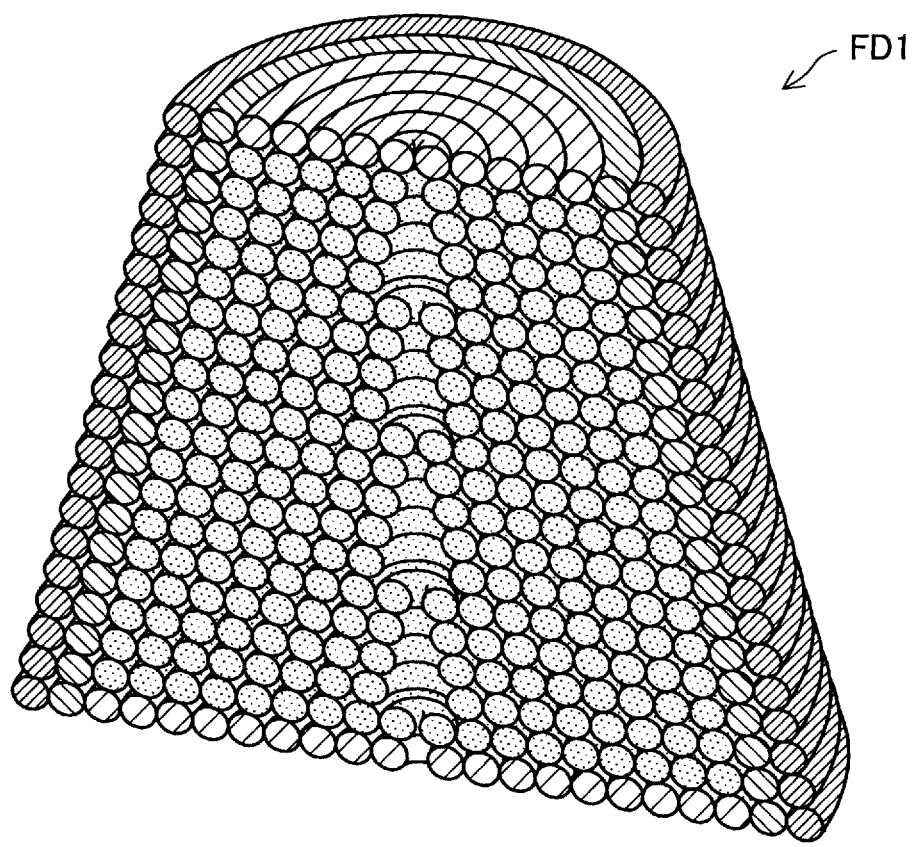
FIG. 24 is a diagram illustrating a cross section of the first shape data in FIG. 23.
Figure 25:
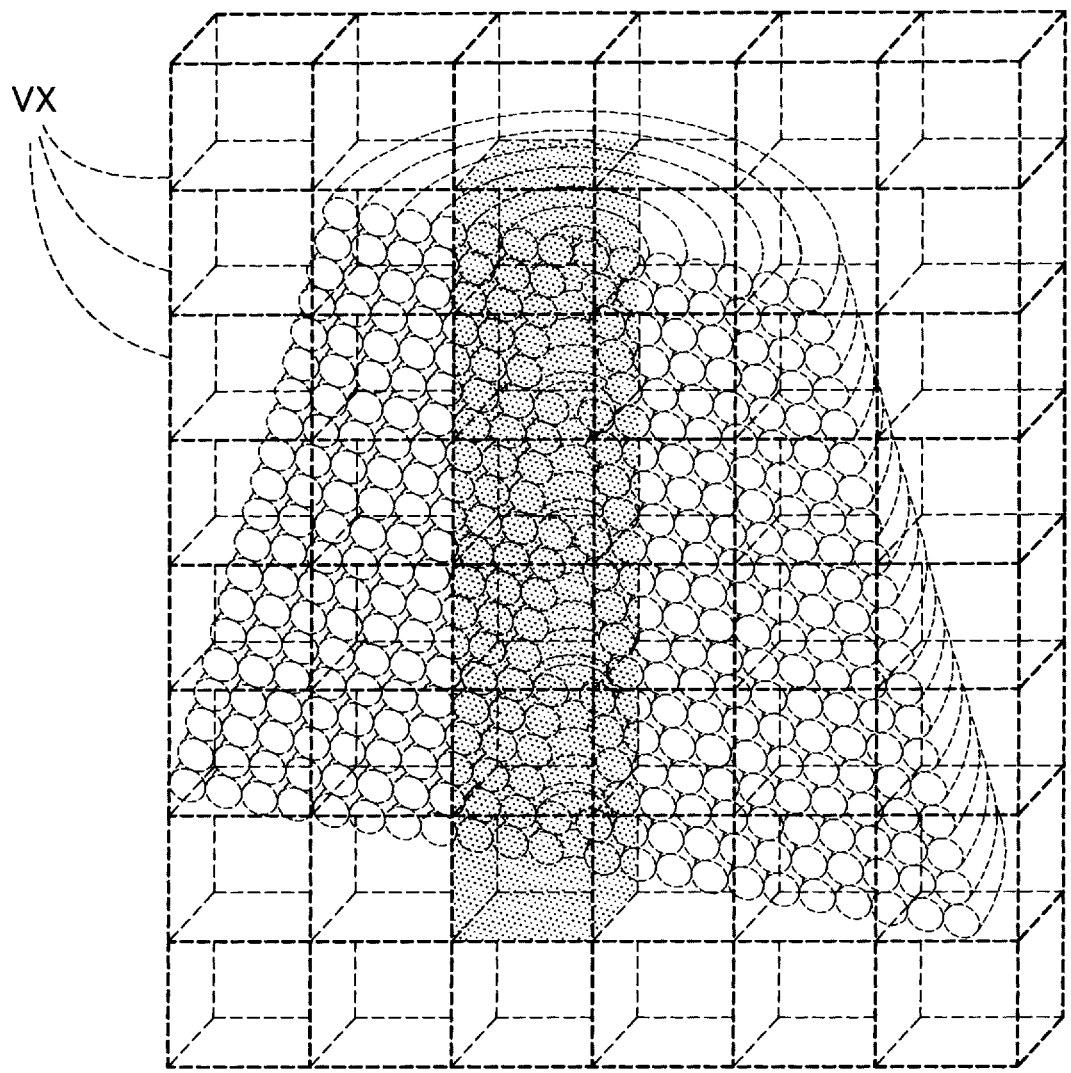
FIG. 25 is a diagram illustrating an example in which void regions illustrated in FIG. 24 are displayed by voxels.

A third modification example of the shaping data will be described with reference to FIGS. 23 to 29. FIG. is a diagram illustrating a display example of the truncated cone-shaped first shape data FD1. FIG. 24 is a diagram illustrating a cross section of the first shape data FD1 in FIG. 23. In the first shape data FD1 illustrated in FIGS. 23 and 24, the internal region of each of the layers is formed by arranging a plurality of concentric circles. In the truncated cone shape, diameters of the concentric circles change according to heights of the layers, so that void regions are generated along the central axis of the truncated cone, as illustrated in FIG. 24. Therefore, when such void regions are displayed by the voxels, the voxels including the central axis of the truncated cone are colored and displayed as illustrated in FIG. 25.

Figure 26:
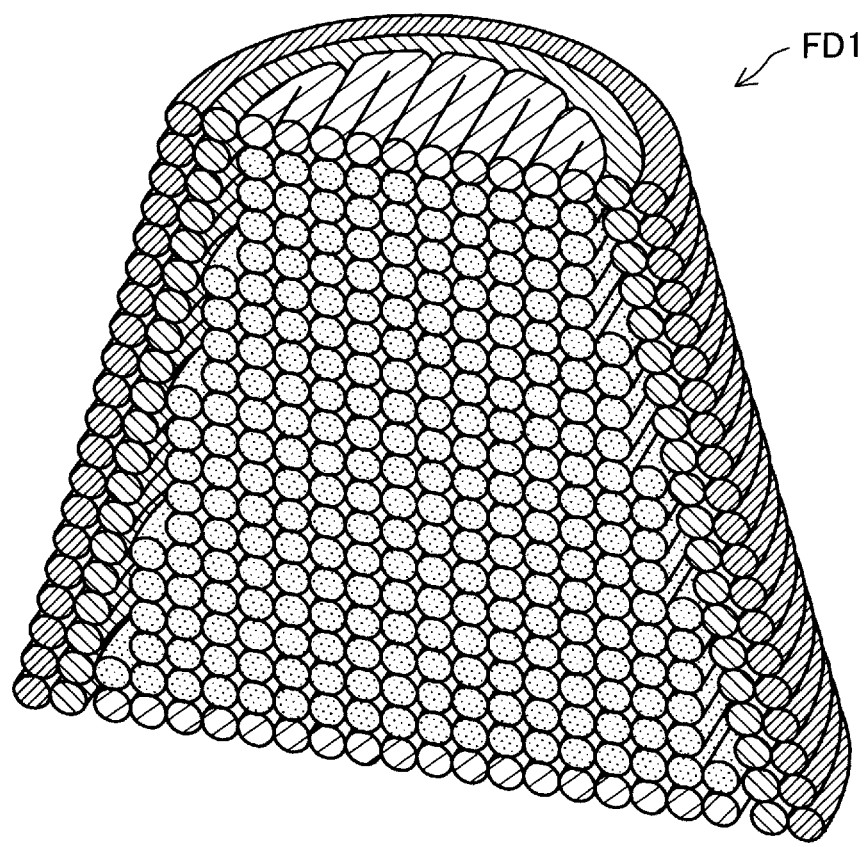
FIG. 26 is a first diagram illustrating an example in which an internal region of each layer is filled with meandering paths.
Figure 27:
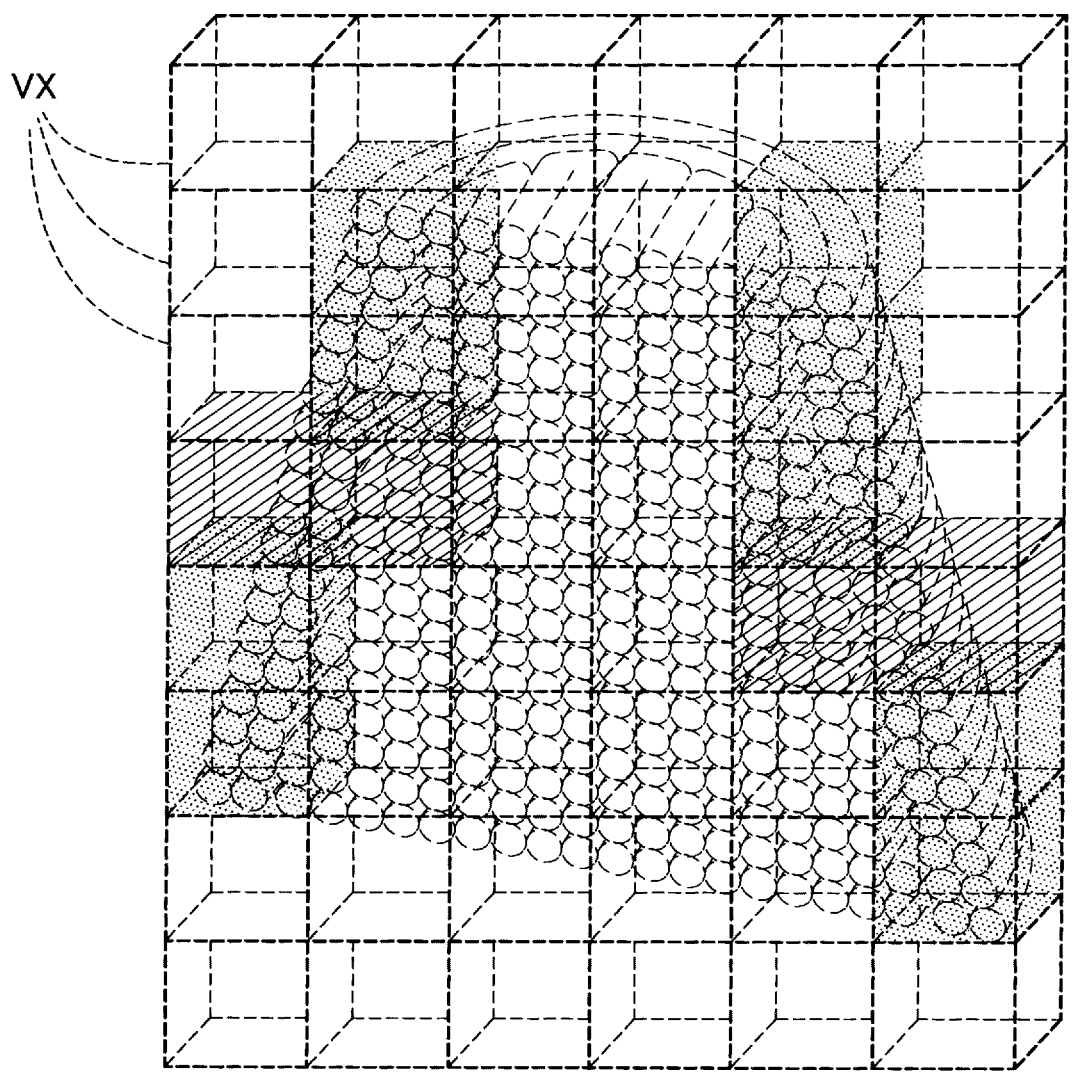
FIG. 27 is a diagram illustrating the void regions in FIG. 26 by voxels.

The data processing unit 102 may change a shaping pattern for filling the internal region so as to fill such void regions with the shaping material. FIG. 26 illustrates an example in which the internal region of each of the layers is filled with meandering paths as illustrated in FIG. 6. By filling the internal region with such paths, a void region near the central axis of the truncated cone can be prevented from being formed. However, in the example illustrated in FIG. 26, the void regions are generated between the internal region and the outer shell region. Therefore, when such void regions are displayed by the voxels, the voxels including a space between the internal region and the outer shell region are colored and displayed as illustrated in FIG. 27.

Figure 28:
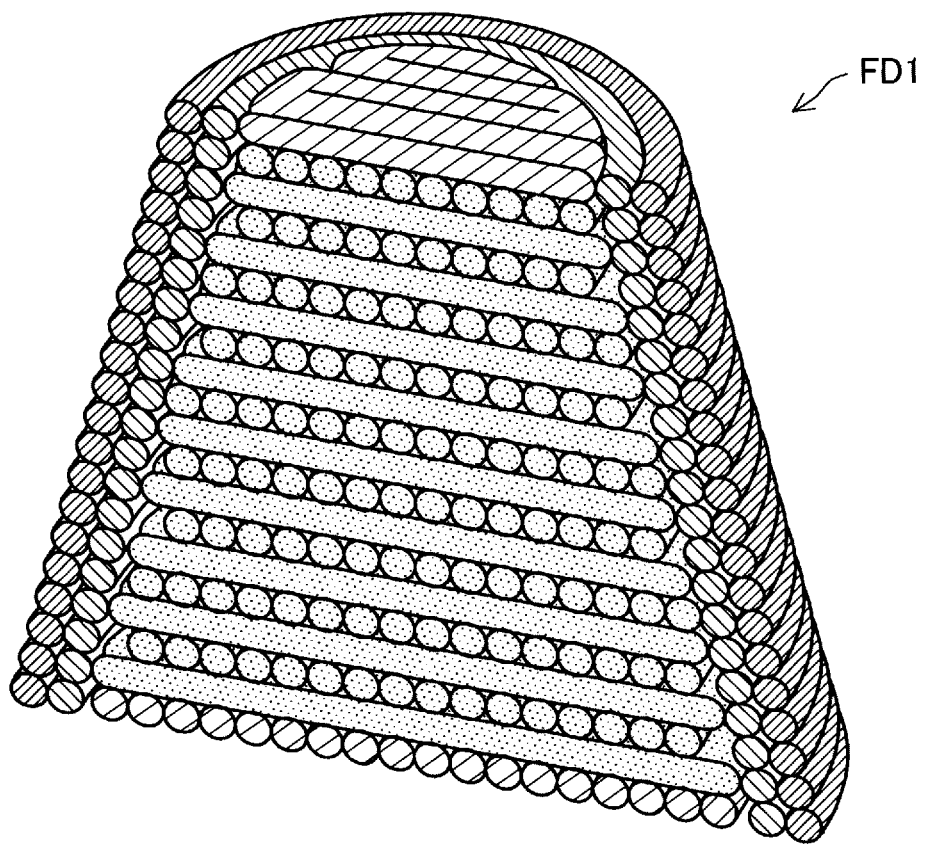
FIG. 28 is a second diagram illustrating an example in which the internal region of each layer is filled with meandering paths.
Figure 29:
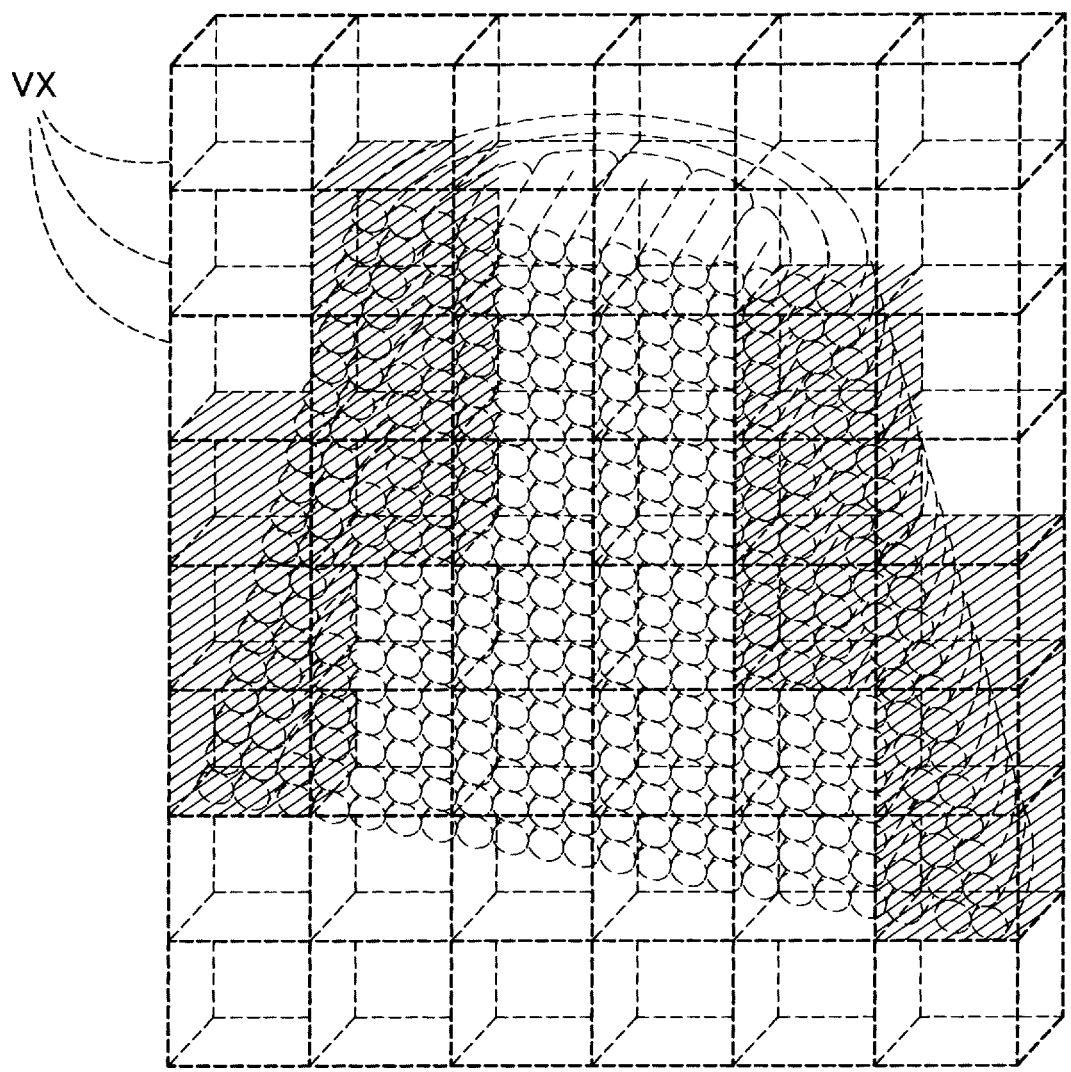
FIG. 29 is a diagram illustrating void regions in FIG. 28 by voxels.

FIG. 28 illustrates an example in which the internal region of each of the layers is filled with the meandering paths as illustrated in FIG. 26, and a meandering direction is changed by 90 degrees for each of the layers. In this case, the void regions between the internal region and the outer shell region can be further reduced. Therefore, when such void regions are displayed by the voxels, the voxels including a space between the internal region and the outer shell region are colored and displayed as illustrated in FIG. 29, and coloring is performed at a level lower than the level of the color illustrated in FIG. 27. The pattern that fills the internal region may be automatically selected by the data processing unit 102 such that the void region becomes smaller, and for example, the user or the data processing unit 102 may select the pattern depending on whether the intensity of the internal region or the intensity of the outer shell region is prioritized. The shape of the first shape data illustrated in FIGS. 23 to 29 is an example, and the shape of the first shape data to be modified is not limited to the truncated cone.

In the second embodiment, the data processing unit 102 can accept the designation of the size of the voxels from the user via the input device. For example, the user can specify the size such as 10 mm³ or 1 mm³. If the size of the voxels is 10 mm³, the void occupancy rate can be roughly displayed. Since the number of calculation times is reduced, a speed until the display of the void occupancy rate of each of the voxels is completed can be increased. If the size of the voxels is 1 mm³, the void occupancy rate can be displayed in detail. Therefore, if the size of the voxels can be specified, the user can multilaterally analyze the void region.

C. Other Embodiments (C1) In the above embodiments, the display unit 105 is coupled to the control unit 101. Alternatively, the display unit 105 may be disposed outside the control unit 101 or the three-dimensional shaping system 10, and a display screen may be transmitted from the control unit 101 to the display unit 105 through a network.

(C2) In the above embodiments, a material is plasticized by the flat screw 40 in the shaping unit 110. In contrast, the shaping unit 110 may plasticize the material by, for example, rotating an in-line screw. In addition, a head used in a thermal dissolution lamination method may be adopted as the shaping unit 110.

(C3) In the above embodiments, the flow rate of the shaping material is adjusted by using the flow rate adjusting unit 70 implemented by a butterfly valve. In contrast, the flow rate of the shaping material may be adjusted by controlling the number of rotation times of the flat screw 40.

(C4) In the above-described embodiments, the control unit 101 executes both the shaping data generation processing and the three-dimensional shaping processing. However, the shaping data generating processing and the three-dimensional shaping processing may be performed by different control units.

(C5) In the above embodiments, the data processing unit 102 has a function of generating shaping data. In contrast, the data processing unit 102 may not have a function of generating the shaping data. In this case, the data processing unit 102 acquires the shaping data generated by the external device, and executes the void region specification processing and the display processing by using the shaping data.

(C6) In the above embodiments, an image, a mark, a voxel, or the like is illustrated as a display that can specify the void region. Meanwhile, the display that can specify the void region may be, for example, numerical information indicating an area or a position of the void region.

(C7) In the above embodiments, a pellet-shaped ABS resin material is used as a raw material to be supplied to the material supply unit 20. In contrast, the three-dimensional shaping device 100 can shape the three-dimensional shaped object by using various materials such as a material having thermoplasticity, a metal material, and a ceramic material as a main material. Here, the "main material" refers to a material serving as a central component for forming a shape of the three-dimensional shaped object, and refers to a material having a content of 50 mass % or more in the three-dimensional shaped object. The above-described shaping material includes a material acquired by melting the main material alone or a material acquired by melting the main material and a part of components contained in the main material into a paste form.

When the material having thermoplasticity is used as the main material, the shaping material generating unit generates the shaping material by plasticizing the material. A term "plasticization" refers to that a material having thermoplasticity is heated and melted.

Examples of the material having thermoplasticity may include the following thermoplastic resin materials.
Examples of Thermoplastic Resin Material General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyether imide, and polyether ether ketone Additives such as a wax, a flame retardant, an antioxidant, and a heat stabilizer in addition to a pigment, a metal, and ceramic may be mixed into the material having thermoplasticity. In the shaping material generating unit 30, the material having thermoplasticity is converted into a melted state by being plasticized by the rotation of the flat screw 40 and heating of the heater 58. After the shaping material generated by melting the material having thermoplasticity is discharged from the nozzle 61, the shaping material is cured due to a reduction in temperature.

The material having thermoplasticity is preferably injected from the nozzle 61 in a state of being heated to a temperature equal to or higher than the glass transition point of this material and completely melted. For example, a glass transition point of the ABS resin is about 120° C., and it is desirable that the ABS resin is discharged from the nozzle 61 at about 200° C.

In the three-dimensional shaping device 100, for example, the following metal materials may be used as the main material instead of the materials having thermoplasticity described above. In this case, it is desirable that a component to be melted at the time of generating the shaping material is mixed with a powder material acquired by converting the following metal materials into a powder, and then the mixture is charged as a raw material into the shaping material generating unit 30.
Examples of Metal Material A single metal such as magnesium (Mg), iron (Fe), cobalt (Co), chromium (Cr), aluminum (Al), titanium (Ti), copper (Cu), and nickel (Ni), or an alloy containing one or more of these metals
Examples of Alloy Maraging steel, stainless steel, cobalt chromium molybdenum, titanium alloy, nickel alloy, aluminum alloy, cobalt alloy, and cobalt chromium alloy In the three-dimensional shaping device 100, the ceramic material may be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride. When the metal material or the ceramic material described above is used as the main material, the shaping material disposed on the stage 210 may be cured by irradiating with a laser or sintering with hot air.

A powder material of the metal material or the ceramic material to be charged into the material supply unit 20 as the raw material may be a mixed material acquired by mixing a plurality of types of powders of a single metal, powders of an alloy, and powders of the ceramic material. Further, the powder material of the metal material or the ceramic material may be coated with, for example, the thermoplastic resin described above, or a thermoplastic resin other than those described above. In this case, the thermoplastic resin may be melted in the shaping material generating unit 30 to exhibit fluidity.

For example, the following solvents may be added to the powder material of the metal material or the ceramic material to be charged into the material supply unit 20 as the raw material. As the solvent, one kind or a combination of two or more kinds selected from the following can be used.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate In addition, for example, the following binders may be added to the powder material of the metal material or the ceramic material to be charged into the material supply unit 20 as the raw material.

Examples of Binder

Acrylic resin, epoxy resin, silicone resin, cellulose-based resin or other synthetic resins, polylactic acid (PLA), polyamide (PA), polyphenylene sulfide (PPS), polyetheretherketone (PEEK) or other thermoplastic resins D. Other Aspects The present disclosure is not limited to the above embodiments, and can be implemented by various configurations without departing from the gist of the present disclosure. For example, in order to solve a part or all of problems described above, or to achieve a part or all of the effects described above, technical features in the embodiments corresponding to technical features in aspects to be described below can be replaced or combined as appropriate. The technical features can be deleted as appropriate unless described as essential in the present specification.

(1) A first aspect of the present disclosure provides an information processing device. The information processing device includes a data processing unit that specifies a void region of a three-dimensional shaped object based on shaping data for shaping the three-dimensional shaped object, the shaping data including path information indicating a movement path of a discharge unit that moves while discharging a shaping material and discharge amount information indicating a discharge amount of the shaping material in the movement path; and a display control unit that display, on a display unit, at least a part of first shape data indicating a shape of the three-dimensional shaped object generated based on the shaping data, in which the display control unit performs, on the display unit, a display that can specify the void region in at least a part of the first shape data.

According to this aspect, since the display that can specify the void region in the first shape data is performed with respect to the display unit, the void region of the three-dimensional shaped object, which is related to shaping quality, can be confirmed in advance before shaping. Therefore, unexpected shaping failures can be prevented.

(2) In the above aspect, the display control unit displays, on the display unit, an outline of the first shape data and an image indicating a range of the void region. According to this aspect, a size of the void region with respect to an outline of the three-dimensional shaped object can be easily confirmed.

(3) In the above aspect, the display control unit may mark the range of the void region of at least a part of the first shape data displayed on the display unit. According to this aspect, the range of the void region in the first shape data being displayed can be easily confirmed.

(4) In the above aspect, the data processing unit divides a region where the three-dimensional shaped object exists into a plurality of voxels, and calculates a rate of the void region for each of the voxels as a first rate, and the display control unit may display a mark corresponding to the first rate for each of the voxels on the display unit. According to this aspect, a density of the voids can be visually confirmed.

(5) In the above aspect, the data processing unit calculates the rate of the void region of the voxels that overlap the voxels in a predetermined direction as a second rate, and the display control unit may change the mark corresponding to the first rate according to the second rate and display the changed mark on the display unit. According to this aspect, the density of voids over a plurality of layers can be visually confirmed.

(6) In the above aspect, the data processing unit may accept designation of a size of the voxels. According to this aspect, a user can multilaterally analyze the void region.

(7) In the above aspect, the display control unit may display an alert on the display unit when the first rate is equal to or higher than the predetermined rate. According to this aspect, an intensity of the three-dimensional shaped object can be prevented from being unintentionally reduced by the user.

(8) In the above aspect, the data processing unit may modify the shaping data such that the void region of the voxels whose first rate is equal to or higher than the predetermined rate is filled with the shaping material. According to this aspect, the intensity of the three-dimensional shaped object can be improved.

(9) In the above aspect, the data processing unit may acquire the second shape data indicating the shape of the three-dimensional shaped object, generate layer data obtained by slicing the shape of the three-dimensional shaped object into a plurality of layers based on the second shape data, and generate the shaping data including the path information and the discharge amount information for each of the layers included in the layer data.

(10) In the above aspect, the data processing unit may specify the void region of the three-dimensional shaped object based on the first shape data and the second shape data. According to this aspect, the void region can be specified more accurately than the void region is specified only based on the first shape data.

(11) In the above aspect, the data processing unit may slice the shape of the three-dimensional shaped object according to a slicing direction selected by the user to generate the layer data, and the display control unit may perform a display that can specify the void region according to the slicing direction. According to this aspect, the void region can be easily confirmed according to the slicing direction.

(12) A second aspect of the present disclosure is directed to a three-dimensional shaping system including the above-described information processing device, and a three-dimensional shaping device that shapes the three-dimensional shaped object according to the shaping data.

(13) A third aspect of the present disclosure is directed to a three-dimensional shaping device configured to be coupled to the above-described information processing device.

(14) A fourth aspect of the present disclosure provides an information display method. The information display method includes a specifying step of specifying a void region of a three-dimensional shaped object based on shaping data for shaping the three-dimensional shaped object, the shaping data including path information indicating a movement path of a discharge unit that moves while discharging a shaping material and discharge amount information indicating a discharge amount of the shaping material in the movement path; and a displaying step of displaying, on a display unit, at least a part of first shape data indicating a shape of the three-dimensional shaped object generated based on the shaping data, in which the displaying step performs. on the display unit, a display that can specify the void region in at least a part of the first shape data.

What is claimed is:

1. An information processing device, comprising:
    a data processing unit configured to specify a void region including voxels, which are to be partially filled with a shaping material, of a three-dimensional shaped object based on shaping data for shaping the three-dimensional shaped object, the shaping data including path information indicating a movement path of a discharge unit configured to move while discharging the shaping material and discharge amount information indicating a discharge amount of the shaping material in the movement path; and
    a display control unit configured to display, on a display unit, at least a part of first shape data indicating a shape of the three-dimensional shaped object generated based on the shaping data, wherein
    the display control unit performs, on the display unit, a display configured to specify the void region in at least a part of the first shape data such that the void region inside the first shape data can be confirmed in advance before shaping the three- dimensional shaped object according to the shaping data, and
    the data processing unit is further configured to calculate a first region of voxels to be filed with the shaping material and a second region based on the path information and the discharge amount information, and calculate the void region by excluding the second region from the first region.

2. The information processing device according to claim 1, wherein
    the display control unit displays, on the display unit, an outline of the first shape data and an image indicating a range of the void region.

3. The information processing device according to claim 1, wherein
    the display control unit marks a range of the void region of at least a part of the first shape data displayed on the display unit.

4. The information processing device according to claim 3, wherein
    the data processing unit divides a region where the three-dimensional shaped object exists into a plurality of voxels, and calculates a first void occupancy rate of the void region for each of the plurality of voxels, and
    the display control unit displays, on the display unit, a mark corresponding to the first void occupancy rate for each of the plurality of voxels.

5. The information processing device according to claim 4, wherein
    the data processing unit calculates a second void occupancy rate of the void region of the plurality of voxels that overlap the plurality of voxels in a predetermined direction, and
    the display control unit changes the mark corresponding to the first void occupancy rate according to the second void occupancy rate and displays the changed mark on the display unit.

6. The information processing device according to claim 4, wherein
    the data processing unit accepts designation of a size of the plurality of voxels.

7. The information processing device according to claim 4, wherein
    the display control unit displays an alert on the display unit when the first void occupancy rate is equal to or higher than a predetermined rate.

8. The information processing device according to claim 4, wherein
    the data processing unit modifies the shaping data such that the void region of the plurality of voxels whose first void occupancy rate is equal to or higher than a predetermined rate is filled with the shaping material.

9. The information processing device according to claim 1, wherein
    the data processing unit is configured to:
        acquire second shape data indicating a shape of the three-dimensional shaped object,
        generate layer data obtained by slicing the shape of the three-dimensional shaped object into a plurality of layers based on the second shape data, and
        generate the shaping data including the path information and the discharge amount information for each of the layers included in the layer data.

10. The information processing device according to claim 9, wherein
    the data processing unit specifies the void region of the three-dimensional shaped object based on the first shape data and the second shape data.

11. The information processing device according to claim 9, wherein
    the data processing unit slices the shape of the three-dimensional shaped object according to a slicing direction selected by a user to generate the layer data, and
    the display control unit performs display configured to specify the void region according to the slicing direction.

12. A three-dimensional shaping system, comprising:
    the information processing device according to claim 1, and
    a three-dimensional shaping device configured to shape the three-dimensional shaped object according to the shaping data.

13. A three-dimensional shaping device configured to be coupled to the information processing device according to claim 1.

14. The information processing device according to claim 1, wherein the void region does not include any voxel in which no shaping material is filled.

15. An information display method, comprising:
    a specifying step of specifying a void region including voxels, which are to be partially filled with a shaping material, of a three-dimensional shaped object based on shaping data for shaping the three-dimensional shaped object, the shaping data including path information indicating a movement path of a discharge unit that moves while discharging the shaping material and discharge amount information indicating a discharge amount of the shaping material in the movement path; and a displaying step of displaying, on a display unit, at least a part of first shape data indicating a shape of the three-dimensional shaped object generated based on the shaping data such that the void region inside the first shape data can be confirmed in advance before shaping the three-dimensional shaped object according to the shaping data, wherein the displaying step performs, on the display unit, a display configured to specify the void region in at least a part of the first shape data, and a first region of voxels to be filed with the shaping material and a second region based on the path information and the discharge amount information are calculated, and the void region is calculated by excluding the second region from the first region.

* * * * *